United States Patent
Okada et al.

(10) Patent No.: US 6,352,284 B1
(45) Date of Patent: Mar. 5, 2002

(54) AIRBAG SYSTEM FOR FRONT PASSENGER'S SEAT

(75) Inventors: Yasushi Okada, Ichinomiya; Kazumasa Suzuki, Ogaki; Yuji Kuriyama, Seki; Hiroshi Ogawa, Hashima, all of (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/712,183

(22) Filed: Nov. 15, 2000

Related U.S. Application Data

(62) Division of application No. 09/188,573, filed on Nov. 10, 1998, now Pat. No. 6,170,857.

(30) Foreign Application Priority Data

Mar. 27, 1998 (JP) .............................. 10-82191

(51) Int. Cl.[7] .............................. B60R 21/16

(52) U.S. Cl. ..................... 280/743.1; 280/732

(58) Field of Search .............................. 280/728.1, 732, 280/743.1, 740, 742

(56) References Cited

U.S. PATENT DOCUMENTS

| | | | | |
|---|---|---|---|---|
| 5,172,933 A | * | 12/1992 | Strasser | 280/740 |
| 5,180,188 A | * | 1/1993 | Frantz et al. | 280/740 |
| 5,211,422 A | * | 5/1993 | Frantz et al. | 280/740 |
| 5,547,218 A | | 8/1996 | Kuretake et al. | 280/743.1 |
| 5,573,270 A | | 11/1996 | Sogi et al. | 280/740 |
| 5,577,765 A | | 11/1996 | Takeda et al. | 280/743.1 |
| 5,593,179 A | | 1/1997 | Maruyama | 280/740 |
| 5,865,466 A | | 2/1999 | Yamamoto et al. | 280/743.1 |
| 5,873,598 A | * | 2/1999 | Yoshioka et al. | 280/740 |
| 5,884,939 A | * | 3/1999 | Yamaji et al. | 280/743.1 |
| 5,918,902 A | | 7/1999 | Acker et al. | 280/743.1 |
| 5,927,748 A | | 7/1999 | O'Driscoll | 280/729 |
| 5,944,344 A | | 8/1999 | Yoshioka et al. | 280/740 |
| 5,957,486 A | | 9/1999 | Taguchi et al. | 280/729 |
| 6,042,144 A | | 3/2000 | Murakame et al. | 280/743.1 |
| 6,050,600 A | * | 4/2000 | Yoshida | 280/740 |
| 6,089,599 A | * | 7/2000 | Schimmoller et al. | 280/740 |
| 6,170,857 B1 | * | 1/2001 | Okada et al. | 280/728.1 |
| 6,176,512 B1 | * | 1/2001 | Rodriguez | 280/728.1 |

FOREIGN PATENT DOCUMENTS

| | | |
|---|---|---|
| DE | 4442118 A1 | 6/1995 |
| DE | 29606709 U1 | 9/1996 |
| DE | 19733143 A1 | 2/1998 |
| DE | 19736243 A1 | 3/1998 |
| DE | 29721678 U1 | 3/1998 |
| EP | 0734911 A1 | 10/1996 |
| GB | 2265118 A | 9/1993 |

OTHER PUBLICATIONS

Air Bag Folding Method, Research Disclosure, No. 413, pp. 1207–1208, Sep./1998.

* cited by examiner

*Primary Examiner*—Paul N. Dickson
*Assistant Examiner*—Deanna L. Draper
(74) *Attorney, Agent, or Firm*—Pillsbury Winthrop LLP

(57) ABSTRACT

An airbag system for a front passenger's seat of the top-mount type according to the invention is arranged in an instrument panel below a windshield. The front passenger's seat airbag system is constructed to include a door, a case and an airbag. The door is arranged on the upper face of the instrument panel. The case houses and holds the airbag in a folded state. The airbag, as housed in the case, is expanded by injecting an inflating gas into a gas inlet port so that the airbag protrudes to open the door and inflate towards the rear side of a vehicle along the windshield. The airbag is equipped with a commutator cloth arranged to cover the gas inlet port. This commutator cloth it arranged to close the two sides in the transverse direction of the vehicle and to open the two sides in the longitudinal direction of the vehicle. This front passenger's seat airbag system reduces the expansion rate of the airbag towards the rear of the vehicle.

5 Claims, 15 Drawing Sheets

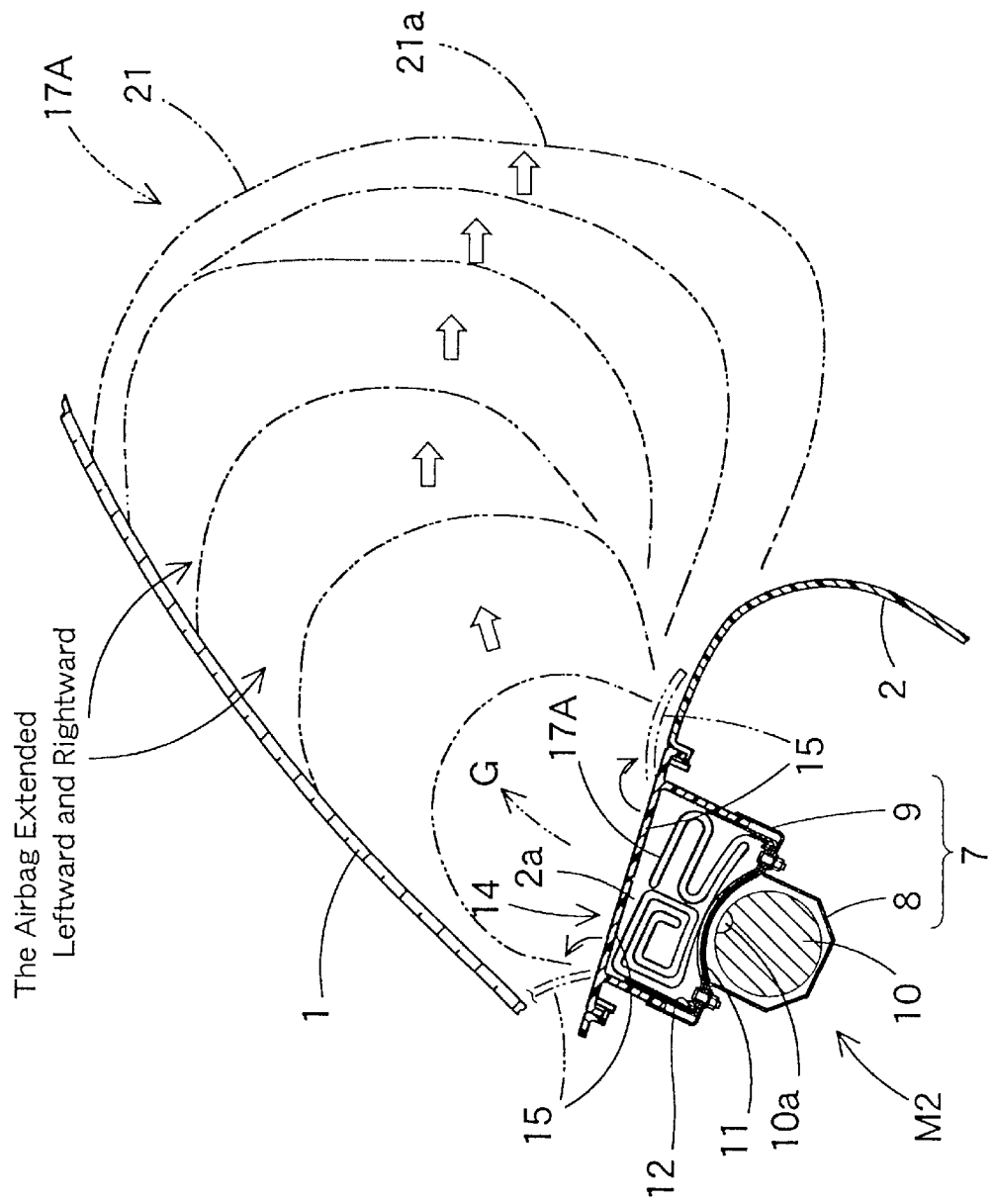

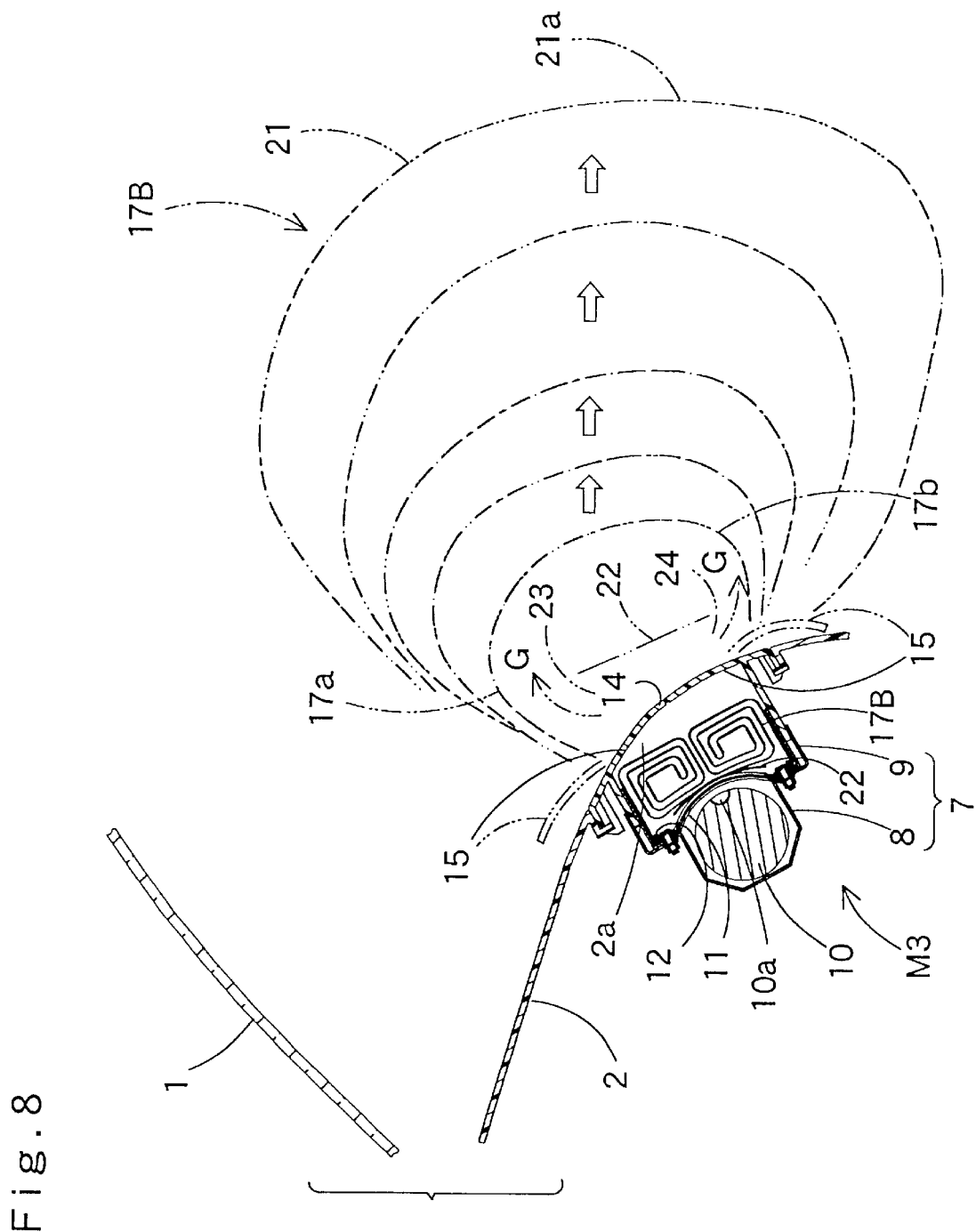

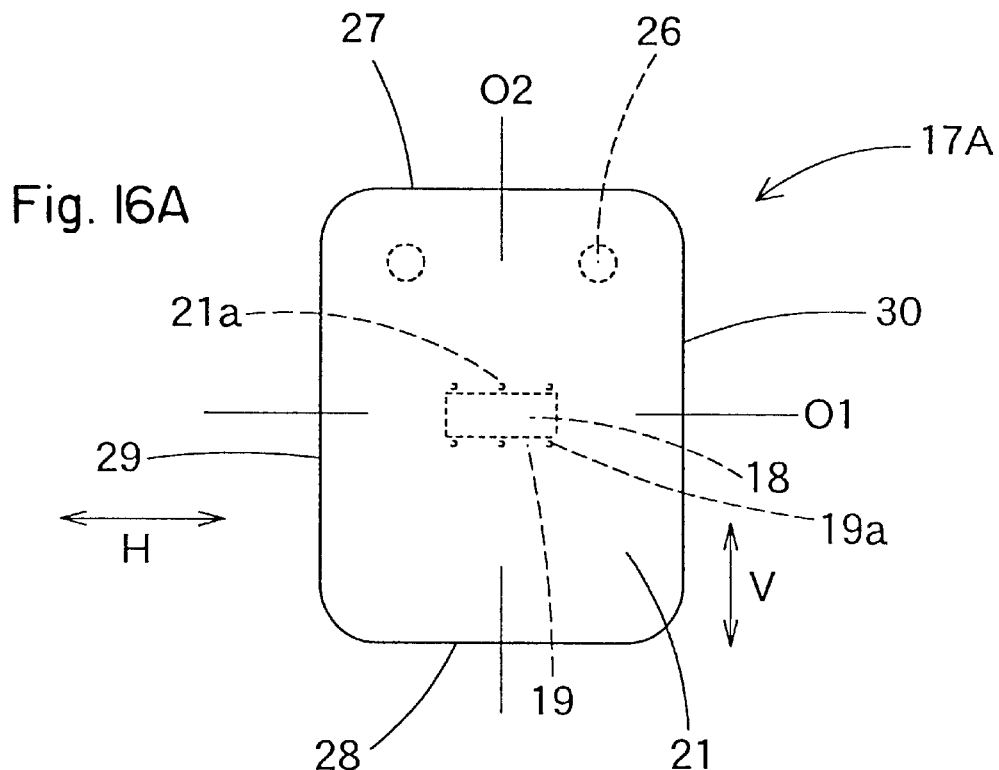
Fig. 16A
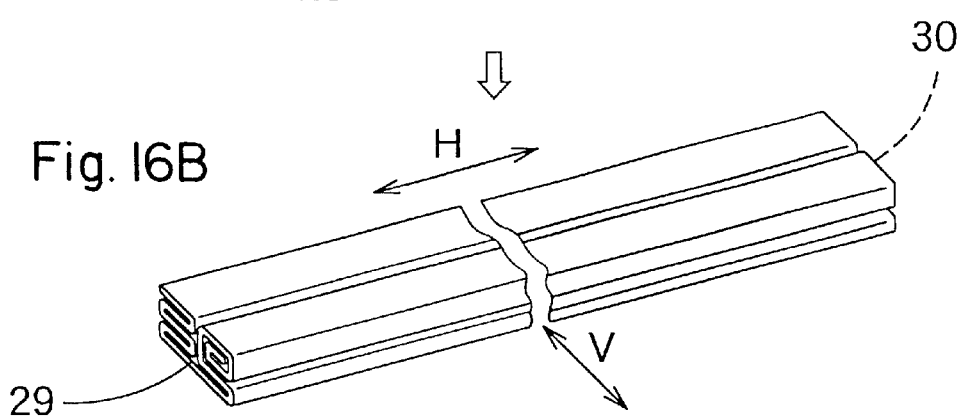
Fig. 16B
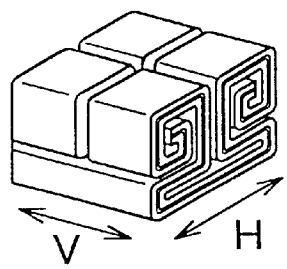
Fig. 16C
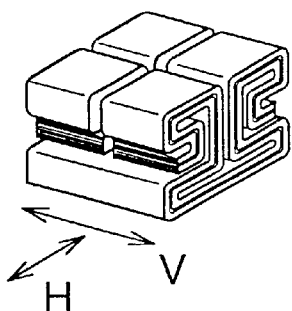
Fig. 16D

AIRBAG SYSTEM FOR FRONT PASSENGER'S SEAT

This is a division of application Ser. No. 09/188,573, filed Nov. 10, 1998 now U.S. Pat. No. 6,170,857.

BACKGROUND OF THE INVENTION

1. Field of the Invention

The present invention relates to an airbag system for a front passenger's seat. This front passenger's seat airbag system is arranged in an instrument panel to the front of the front passenger's seat of a vehicle.

2. Description of Related Art

The front passenger's seat airbag system of the prior art has the modes described below for the expansion of an airbag. Specifically, the airbag extrudes at first from the instrument panel. The airbag is then expanded towards the rear of the vehicle along, for example, a windshield which is sloped downwards towards its front.

However, the airbag of the front passenger's seat air bag system may be desired to satisfy the following purpose, namely, to reduce the expansion rate of the airbag towards the passenger seated on the seat, i.e., the expansion rate towards the rear of the vehicle.

SUMMARY OF THE INVENTION

An object of the present invention is to provide a front passenger's seat airbag system capable of reducing the expansion rate of an airbag toward the rear of the vehicle.

In order to achieve this object, according to a first embodiment of the invention, there is provided a front passenger's seat airbag system of the top-mount type arranged in an instrument panel below a windshield, comprising:

- a door arranged on the upper face of said instrument panel;
- a case; and
- an airbag housed and held in a folded state in said case and including a gas inlet port for injecting an inflating gas thereinto, so that said airbag is expanded, by injecting the inflating gas into said gas inlet ports, towards the rear of a vehicle along said windshield while opening said door,
- wherein said airbag further includes a commutator cloth arranged to cover said gas inlet port and to close the two sides in the transverse direction of the vehicle, and to open the two sides in the longitudinal direction of the vehicle.

In order to achieve the above-specified object, according to a second embodiment of the invention, there is provided a front passenger's seat airbag system arranged in an instrument panel, comprising:

- a door arranged on the upper face of said instrument panel;
- a case; and
- an airbag housed and held in a folded state in said case and including: a gas inlet port for injecting an inflating gas thereinto; and a ceiling wall portion confronting said gas inlet port, so that said airbag is expanded by injecting the inflating gas into said gas inlet port towards the rear of a vehicle while opening said door,
- wherein said airbag is housed in said case by folding said ceiling wall side of said airbag to closely approach said gas inlet port, subsequently by transversely folding the two edges perpendicular to the transverse direction to closely approach the vicinity of the center, and further by longitudinally folding the left and right edges to closely approach the vicinity of the center.

In order to achieve the above-specified object, according to a third embodiment of the invention, there is provided a front passenger's seat airbag system arranged in an instrument panel, comprising:

- a door arranged on the upper face of said instrument panel;
- a case; and
- an airbag housed and held in a folded state in said case and including: a gas inlet port for injecting an inflating gas thereinto; and a ceiling wall portion confronting said gas inlet port, so that said airbag is expanded by injecting the inflating gas into said gas inlet port towards the rear of a vehicle while opening said door,
- wherein said airbag further includes a commutator cloth arranged to cover said gas inlet port,
- wherein said airbag is housed in said case by folding said ceiling wall side of said airbag to closely approach said gas inlet port, subsequently by transversely folding the two edges perpendicular to the transverse direction to closely approach the vicinity of the center, and further by longitudinally folding the left and right edges to closely the vicinity of the center, and
- wherein said commutator cloth is arranged to close the two sides in the transverse direction of the vehicle, and to open the two sides in the longitudinal direction of the vehicle.

In the front passenger's seat airbag system of the top-mount type according to the first embodiment of the invention, the internal pressure rises when the inflating gas is injected into the airbag at the time of expansion of the airbag. Then, the airbag pushes to open the door which is arranged on the instrument panel, until the airbag extrudes out of the instrument panel.

At this expansion time of the airbag, the inflating gas that flows into the airbag is branched to flow forward and backward by the commutator cloth. This quickly expands the airbag in the longitudinal direction. At this time, the front side portion extrudes towards the rear of the vehicle along the windshield. Conversely, the rear side portion protrudes towards the rear of the vehicle along the upper face of the instrument panel.

Specifically, the front side portion at the beginning of expansion extrudes towards the rear of the vehicle along the windshield which is sloped downward to the front. Conversely, the rear side portion at the beginning of expansion extrudes towards the rear of the vehicle along the upper face of the instrument panel. As a result, the airbag is expanded towards the rear of the vehicle at such a vertically large angle so as to close the space between the inner side face of the windshield and the upper face side of the instrument panel.

In the front passenger's seat airbag system according to the first embodiment of the invention, therefore, the airbag, having extruded from the instrument panel, moves towards the rear of the vehicle at a vertically large angle, i.e., with a wide surface having a large area at the portion toward the passenger. In this mode, the airbag is not expanded to extrude partially backwards. As a result, in the front passenger's seat airbag system of the first embodiment, the expansion rate of the airbag towards the rear of the vehicle can be reduced to reduce the expansion rate of the airbag toward the passenger.

In the front passenger's seat airbag system according to the second embodiment of the invention, the internal pressure of the airbag rises when the inflating gas flows at the expansion time of the airbag from the gas inlet port into the airbag. Then, the airbag pushes to open the door which is arranged on the instrument panel, until the airbag extrudes from the instrument panel.

At this time, the airbag, having extruded from the instrument panel, is expanded while being extended to the two sides of the transverse direction thereby to undo the longitudinal folding, and is then expanded while being extended to the two sides in the direction perpendicular to the transverse direction, thereby to undo the transverse folding.

Specifically, the airbag is extended at first to the two sides of the transverse direction without extruding towards the rear of the vehicle. That is, at first, the airbag is expanded towards the rear of the vehicle while undoing its longitudinal folding with its surface having an enlarged wide area.

In the front passenger's seat airbag system of the second embodiment of the invention, therefore, the airbag having extruded from the instrument panel is expanded towards the rear of the vehicle with its portion on the front passenger's side being given a surface having a wide area which is enlarged to the two sides in the transverse direction. In the front passenger's seat airbag system of the second embodiment, too, the expansion rate of the airbag towards the rear of the vehicle can be reduced to reduce the expansion rate of the airbag towards the passenger.

Here, the front passenger's seat airbag system according to the second embodiment of the invention should not be limited to the top-mount type, but may also be of the midway-mount type.

In the front passenger's seat airbag system according to the third embodiment of the invention, the internal pressure of the airbag rises when the inflating gas flows at the expansion time of the airbag from the gas inlet port into the airbag. Then, the airbag pushes to open the door which is arranged on the instrument panel, until the airbag extrudes from the instrument panel.

Moreover, the airbag is expanded at first, after having extruded from the instrument panel, while being extended to the two sides of the transverse direction thereby to undo the longitudinal folding. Conversely, the inflating gas that flows into the airbag is branched by the commutator cloth to flow either forward and backward perpendicular to the transverse direction, or upward and downward. As a result, the airbag is quickly extended to the two sides in the direction perpendicular to the transverse direction by the commutator cloth.

In other words, the airbag is expanded towards the rear of the vehicle with a wide area which is extended in four directions, including not only the transverse directions but also the perpendicular directions to the transverse direction.

In the front passenger's seat airbag system according to the third embodiment of the invention, therefore, the airbag having extruded from the instrument panel is expanded towards the rear of the vehicle with the portion on the front passenger's side being given a wide area which is extended in four directions including the transverse directions and the perpendicular directions to the transverse direction. In the front passenger's seat airbag system of the third embodiment, therefore, the expansion rate of the airbag towards the rear of the vehicle can be reduced to reduce the expansion rate of the airbag towards the passenger.

Here, the front passenger's seat airbag system according to the third embodiment of the invention should not be limited to the top-mount type, but may be of the midway-mount type.

BRIEF DESCRIPTION OF THE DRAWINGS

FIG. 6 is a schematic diagram showing an inflated state of an airbag of an airbag system according to a second embodiment;

FIG. 8 is a schematic diagram showing an inflated state of an airbag of an airbag system according to a third embodiment;

FIG. 16 are views for explaining a process of folding the airbag of a modification of the fifth embodiment.

DESCRIPTION OF THE PREFERRED EMBODIMENTS

The invention will be described in connection with its embodiments with reference to the accompanying drawings. Here, the invention should not be limited to its embodiments, but all the modifications within the requisites of the Claims, or equivalents to the requisites, should also be included within the scope of the Claims.

Figure 1:
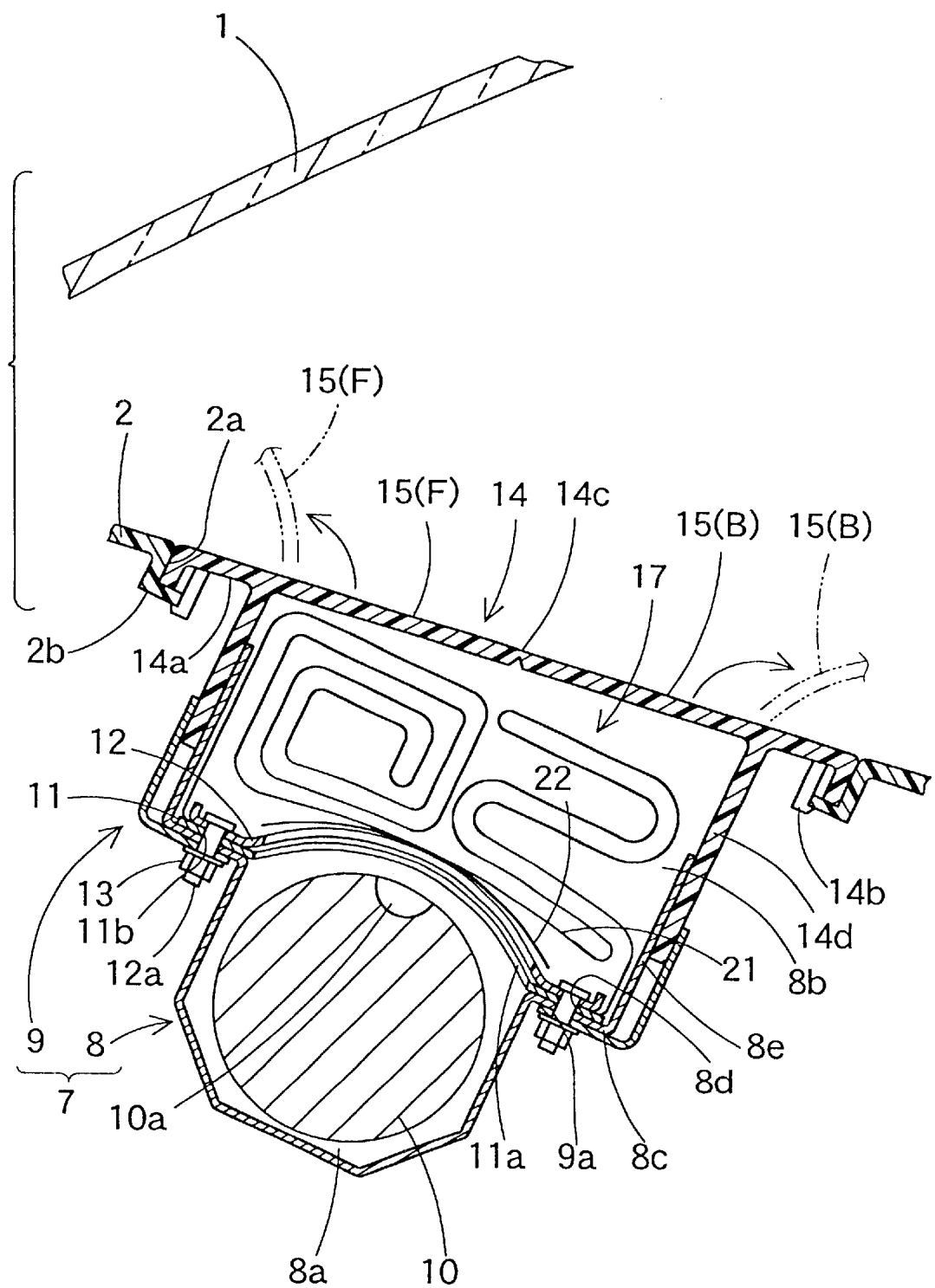
FIG. 1 is a sectional view showing the usage mode of an airbag system according to a first embodiment of the invention.

An airbag system M1 for a front passenger's seat according to a first embodiment is of the top mount-type, in which it is arranged in an instrument panel below a windshield 1, as shown in FIG. 1. The airbag system M1 is configured to include a case 7, an inflator 10, a diffuser 11, a retainer 12, a cover member 14 and an airbag 17.

The case 7 is made of sheet metal, and comprised of a body 8 and a hold member 9. The body 8 is formed into a generally rectangular prism. The body 8 is constructed to include a lower chamber 8a and an upper chamber 8b. In the lower chamber 8a, there is housed the inflator 10. In the upper chamber 8b, there is housed the airbag 17 in a folded state. The hold member 9 is arranged around the upper portion of the body 8. The hold member 9 is formed into a generally square cylinder. Moreover, the hold member 9 covers to below a stepped portion 8c at the lower portion of the upper chamber 8b and a peripheral wall 8e of the upper chamber 8*b*. The stepped portion 8*c* and the portion covering the stepped portion 8*c* of the hold member 9 are provided with through holes 8*d* and 9*a*. Into these through holes 8*d* and 9*a*, there are inserted individual bolts 12*a* of the retainer 12. Here, the peripheral wall 8*e* of the upper chamber 8*b* are equipped with a plurality of not-shown retainer pawls. These retainer pawls are formed by raising the peripheral wall 8*e*. Moreover, these retainer pawls retain a later-described side wall portion 14*d* of the cover member 14 to prevent the side wall portion 14*d* from extruding upward. Thus, the hold member 9 has a function to position and hold the side wall portion 14*d*. Specifically, the hold member 9 holds the side wall portion 14*d* to prevent the side wall portion 14*d* of the cover member 14, as retained by the not-shown retainer pawls of the peripheral wall 8*e*, from coming out of the retainer pawls.

The inflator 10 is formed into a circular column shape. The inflator 10 is provided with a gas discharge port 10*a* for an inflatable gas to inflate the airbag 17. The inflator 10 is housed and held in the lower chamber 8*a* of the case 7.

The diffuser 11 is made of sheet metal having a generally rectangular shape. The diffuser 11 is shaped at its peripheral edge to match the stepped portion 8*c* of the case body 8. The diffuser 11 is provided at a predetermined positions with gas communication holes 11*a* for passing the inflatable gas therethrough. Moreover, the diffuser 11 is provided at its peripheral edge with through holes 11*b* for receiving the individual bolts 12*a* of the retainer 12.

This retainer 12 is made of a sheet metal and is formed into a generally square of an annular shape. The retainer 12 is equipped with extending downward bolts 12*a*. These individual bolts 12*a* are inserted into later-described mount holes 19*a* of the airbag 17, the through holes 11*b* of the diffuser 11, the through holes 8*d* of the case body 8, and the through holes 9*a* of the hold member 9. By fastening nuts 13 on the individual bolts 12*a*, moreover, the retainer 12 fixes the airbag 17 and the diffuser 11 in the case 7. At this time, the case 7 itself is assembled.

The cover member 14 is made of a thermoplastic elastomer of olefin or styrene. This cover member 14 is comprised of a ceiling wall portion 14*a* and a side wall portion 14*d*. The ceiling wall portion 14*a* is arranged in an opening 2*a* which is formed generally in a vertical direction and in a rectangular shape in the instrument panel 2. The side wall portion 14*d* is extended downward in the shape of a square cylinder from the lower face of the ceiling wall portion 14*a*. The ceiling wall portion 14*a* is provided on the lower face of its outer peripheral edge with a plurality of retainer pawls 14*b* to be retained on an opening peripheral edge 2*b*. These retainer pawls 14*b* are arranged for making the ceiling wall portion 14*a* and the instrument panel 2 to continue smoothly. In the ceiling wall portion 14*a* inside of the side wall portion 14*d*, on the other hand, there are arranged two doors 15. These doors 15 are surrounded by thin portions 14*c* to be ruptured when the airbag 17 expands. This rupture portion 14*c* is formed into the shape of the letter "H", as viewed downward in the longitudinal direction of the vehicle. These two doors 15 are arranged longitudinally of the vehicle. When the airbag 17 expands, moreover, the door 15 (F), as arranged on the front side, is opened forward, whereas the door 15(B), as arranged on the rear side, is opened backward.

Here, the side wall portion 14*d* is provided with not-shown retainer pawls. These retainer pawls are retained on the peripheral edge of the not-shown retainer holes which are formed in the peripheral edge 8*e* of the case body 8, as already described.

Figure 2:
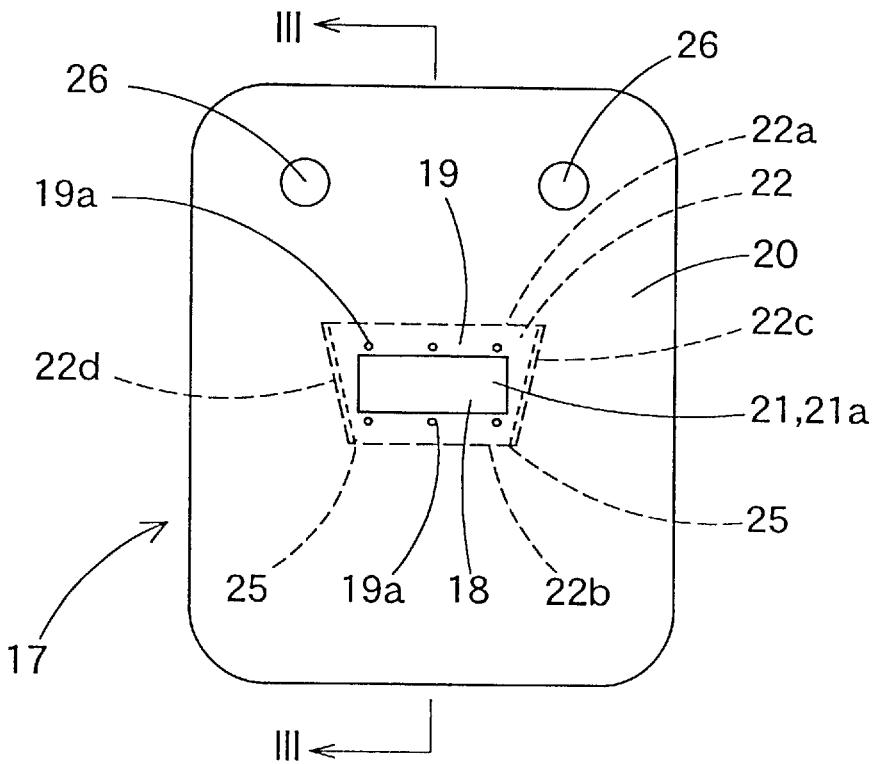
FIG. 2 is a bottom view of an airbag to be used in the first embodiment.
Figure 3:
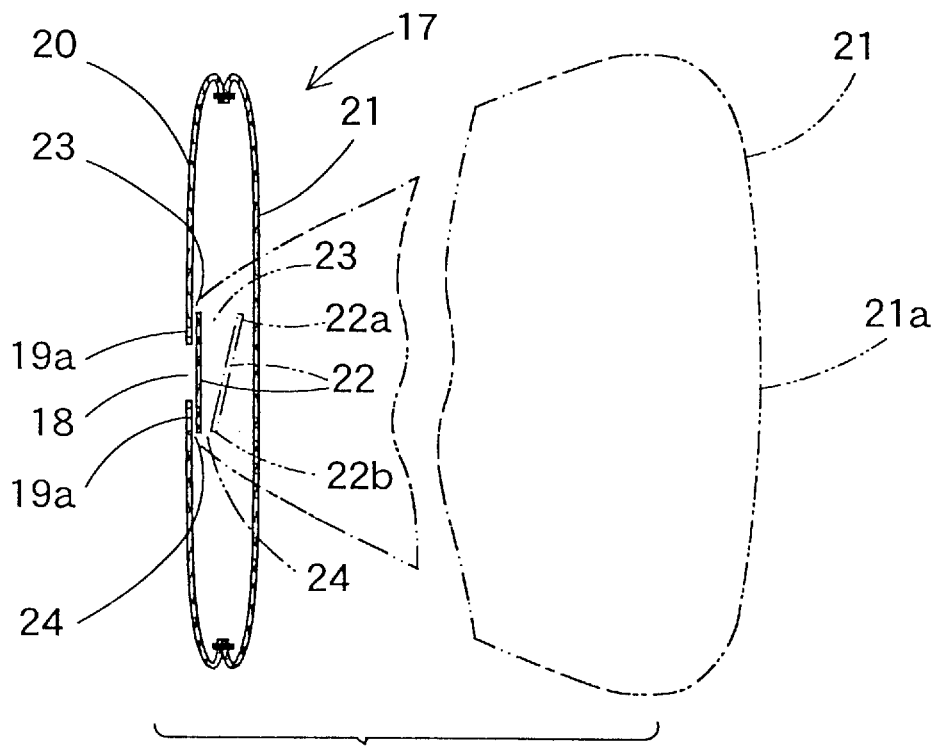
FIG. 3 is an end view taken along line III—III of FIG. 2.
Figure 4A:
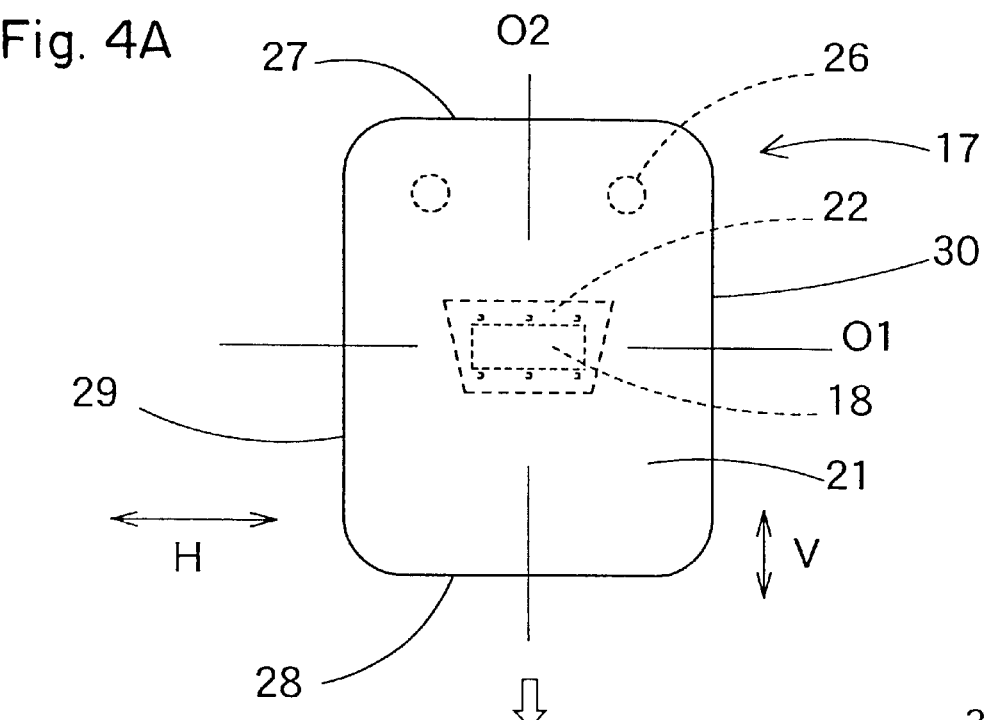
FIG. 4 are views for explaining a process of folding the airbag of the first embodiment.
Figure 4B:
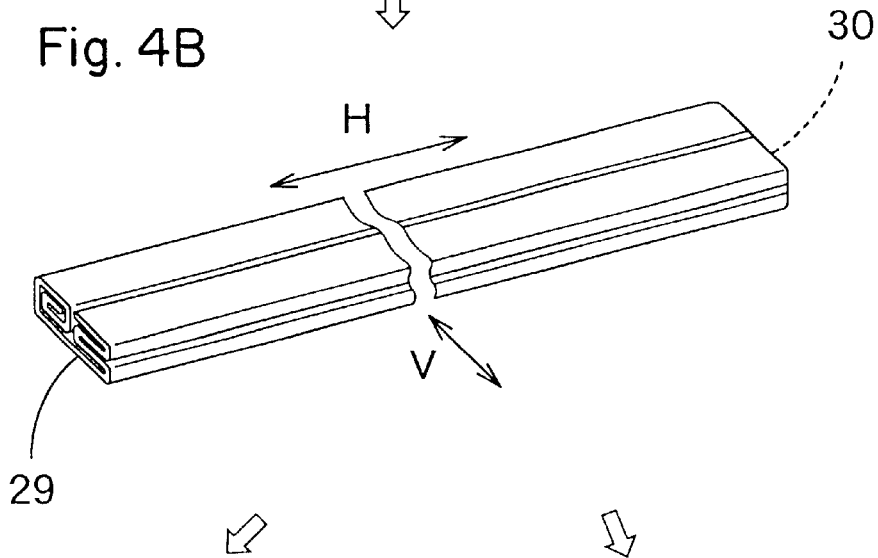
Figure 4C:
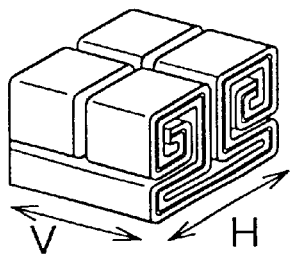
Figure 4D:
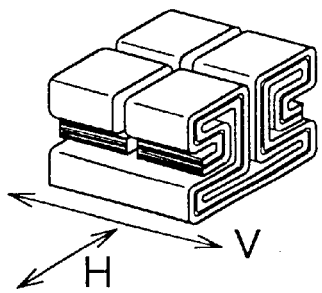

The airbag 17 is formed into a bag shape having a gas inlet port 18, as shown in FIGS. 1 through 3. This airbag 17 is made of two sheets of woven fabric of flexible polyamide or polyester threads. The airbag 17 is formed by sewing together the peripheral edges of these fabric sheets. Moreover, the airbag 17 is made, when inflated, to take a shape of a generally frustoconical quadrangular pyramid, as shown by the double-dotted lines in FIG. 3. The gas inlet port 18 is equipped at its peripheral edge with a mount sheet portion 19 to be mounted on the case 7. This mount sheet portion 19 is provided with the mount holes 19*a* for receiving the individual bolts 12*a* of the retainer 12. Here, reference numeral 26 designates vent holes.

Moreover, this airbag 17 is equipped with a commutator cloth 22. This commutator cloth 22 is arranged so as to cover the gas inlet port 18. The commutator cloth 22 is made of woven fabric similar to that of a peripheral wall 20 of the airbag 17. The commutator cloth 22 is sewn, at both its left and right edges 22*c* and 22*d*, to the peripheral wall 20 by making use of a sewing thread 25. In short, the commutator cloth 22 is arranged so as to cover the two sides in the transverse direction of the vehicle when the airbag 17 is mounted within the vehicle, and to open towards the two sides in the longitudinal direction of the vehicle when the airbag 17 is mounted within the vehicle. Moreover, the commutator cloth 22 of the embodiment is shaped such that its front edge 22*a* is longer than its rear edge 22*b*. In addition, the commutator cloth 22 is set in relation to the areas of openings 23 and 24 in the longitudinal direction of the vehicle (i.e., in relation to the open areas to be made between the front and rear edges 22*a* and 22*b* of the commutator cloth 22 and the peripheral wall 20) such that the front opening 23 is larger than the rear opening 24. In the case of the present embodiment, for example, the opening 23 and the opening 24 are given an area ratio of 4:3.

Next will be described a process for folding the airbag 17. First, as shown at A in FIG. 4, the airbag 17 is folded so that a ceiling wall portion 21 confronting the gas inlet port 18 may be brought close to the gas inlet port 18.

After this, as shown at A and B in FIG. 4, the airbag 17 is folded transversely so that its two longitudinal edges 27 and 28 perpendicular to the transverse direction may be brought close to the vicinity of a center O1. This transverse folding makes a transverse fold H. This transverse fold H extends in the transverse direction of the vehicle when the airbag system M1 is mounted within the vehicle. In the case of the embodiment, moreover, the front edge 27 is rolled toward the center of the ceiling wall portion 21 (i.e., in an externally rolled folding method). On the other hand, the rear edge 28 is folded in a bellows shape.

Next, as shown at C in FIG. 4, the airbag 17 is folded longitudinally so that its two left and right edges 29 and 30 may be brought close to a center O2. This longitudinal folding makes a fold V in the direction perpendicular to the transverse direction. This longitudinal fold V extends in the longitudinal direction of the vehicle when the airbag system M1 is mounted within the vehicle. In the folding of the present embodiment, the left and right edges 29 and 30 are rolled at first toward the gas inlet port 18 (i.e., in an internally rolled folding method), and are then placed on the center of the ceiling wall portion 21.

When the airbag 17 is to be rolled in the manner shown at B and C in FIG. 4, the retainer 12 is, as a matter of fact, housed in the airbag 17. In other words, the bolts 12*a* are protruded from the individual mount holes 19*a*.

Next, will be described a process for assembling the airbag system M1. First, the diffuser 11 and the inflator 10 are arranged with respect to the case body 8. The folded airbag 17 is then housed in the case body 8 while inserting the individual bolts 12a of the retainer 12 into the through holes 11b and 8d. The cover member 14 is then placed on the body 8 to retain the not-shown retainer pawls of the peripheral wall 8e on the peripheral edges of the not-shown retainer holes of the side wall portion 14d. Moreover, the hold member 9 is arranged upward around the body 8 so as to insert the bolts 12a into the individual through holes 9a. Moreover, by fastening the nuts 13 on the individual bolts 12a, it is possible to assemble the airbag system M1.

After this, the retainer'pawls 14b of the cover member 14 are retained on the opening peripheral edge 2b of the instrument panel 2. Moreover, the not-shown bracket extending from the case 7 is jointed and fixed to the frame of the vehicle. At that time, the airbag system M1 can be mounted in position within the instrument panel 2, as shown in FIG. 1.

If an inflating gas G is discharged from the gas discharge port 10a of the inflator 10 after the airbag system M1 has been mounted on the vehicle, this inflating gas G flows from the gas inlet port 18 into the airbag 17. Here, the gas inlet port 18 is covered with the ceiling wall portion 21, while the commutator cloth 22 is interposed between the ceiling wall portion 21 and the gas inlet port 18. As a result, the area at the vicinity of the central portion 21a of the ceiling wall portion 21 and the folded portion covering the central portion 21a move at first upward away from the gas inlet port 18. Then, the area at the vicinity of the central portion 21a and the folded portion covering the central portion 21a break the thin rupture portion 14c of the cover member 14 to open the doors 15 and 15.

At this time, the airbag 17 extrudes out of the opening 2a of the instrument panel 2. Moreover, the airbag 17 expands while extending to the two sides of the transverse direction so as to undo the longitudinal fold. On the other hand, the inflating gas G is branch, as it flows into the airbag 17, forward and backward at right angles with respect to the transverse direction by the action of the commutator cloth 22. As a result, the airbag 17 is quickly extended by the commutator cloth 22 to the two sides of the longitudinal direction perpendicular to the transverse direction.

In other words, the airbag 17 is expanded, immediately after having extruded from the opening 2a of the instrument panel 2, not only in the transverse direction but also in the longitudinal direction perpendicular to the transverse. Thus, the airbag 17 is expanded towards the rear of the vehicle with a wide area extending in four directions, namely the leftward, rightward, forward and backward directions. Moreover, a front portion 17a on the front side of the airbag 17 moves backward along the windshield 1 while interfering with the same.

As a result, the airbag 17 is expanded backwards with the area at the vicinity of the central portion 21a of the ceiling wall portion 21 being arranged generally vertically and extended widely.

Figure 5:
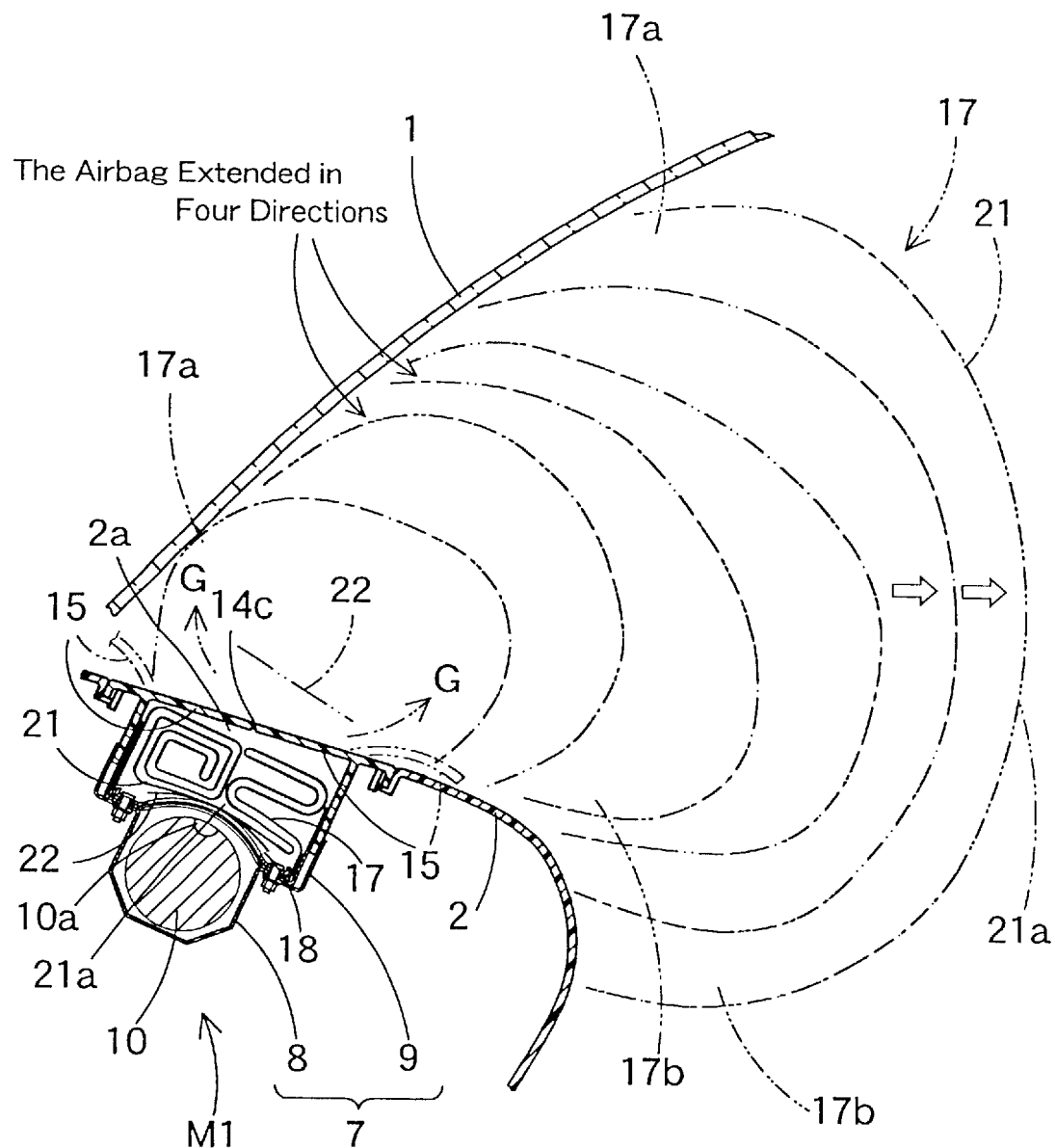
FIG. 5 is a schematic diagram showing an inflated state of the airbag of the first embodiment.

In the airbag system M1, therefore, the airbag 17 is expanded towards the rear of the vehicle, as shown in FIG. 5, with its portion for the front passenger's side, i.e., the area at the vicinity of the central portion 21a of the ceiling wall portion 21, being widened in the four directions, i.e., leftward and rightward, and upward and downward, as perpendicular to the rear wards direction. In the airbag system M1, therefore, the expansion rate of the airbag 17 backward of the vehicle can be reduced. In the airbag system M1, more specifically, the expansion rate of the airbag 17 toward the passenger can be reduced. In the airbag system M1, moreover, the pressure induced on the passenger can be suppressed even while the airbag 17 restricts the passenger in the course of its expansion.

In the first embodiment, moreover, the openings 23 and 24 at the front and rear edges of the commutator cloth 22 are set such that the area of the front opening 23 is larger than that of the rear opening 24. In other words, the front portion 17a at the beginning of the expansion of the airbag 17 increases the inflow of the inflating gas G. Therefore, the front portion 17a moves along the windshield 1, which is sloped downward towards its front, while being arranged in a longitudinal position substantially identical to that of a portion 17b, which is as located at the rear side at the beginning of the expansion. As a result, the airbag 17 is expanded backward along with the area at the vicinity of the central portion 21a of the ceiling wall portion 21, located on the side of the passenger, being in a vertical plane. In other words, the airbag 17 being expanded has a reduced portion protruding partially toward the navigator. In the airbag system M1, therefore, the pressure induced on the passenger can be reduced even further, even while it restricts the passenger before the expansion is ended.

In the first embodiment, moreover, the front portion 17a is externally rolled when the airbag 17 is transversely folded. At the time of expansion, therefore, the front portion 17a is extended along the windshield 1 as if it were being unrolled. As a result, this airbag 17 enables a dampening, when expanded, of the impact at the time when it hits the windshield 1.

Even further, in the first embodiment, the rear portion 17b is folded in a bellows shape when the airbag 17 is transversely folded. This bellows-shaped folding can be extended more rapidly than the rolled-up type of folding. As a result, the rear portion 17b can be quickly extended along the upper face of the instrument panel 2 when the airbag 17 is expanded. As a result, the rear portion 17b of the airbag 17 can be interposed quickly between the passenger and the instrument panel 2.

Here in the first embodiment, at the time of the longitudinal folding of the airbag 17, the left and right edges 29 and 30 are internally rolled on the center side of the ceiling wall portion 21, as shown at C in FIG. 4. When the airbag 17 is longitudinally folded, however, a modified internal rolling may be adopted, as shown at D in FIG. 4, such that the left and right edges 29 and 30 are folded towards the gas inlet port 18, and such that the folded portion is then placed on the center side of the ceiling wall portion 21.

Here, the following merits can be enabled by the longitudinal folding of the airbag 17 if the internally rolled folding or the modified internally rolled folding is adopted so as to arrange the folding portion on the center side of the ceiling wall portion 21. As compared with the case of the bellows-shaped folding or the externally rolled folding, the left and right edges 29 and 30 can be less extended toward the passenger when the airbag 17 is expanded. As a result, the airbag 17 can be moved, when expanded, towards the passenger with a transversely extended wider area.

Figure 7A:
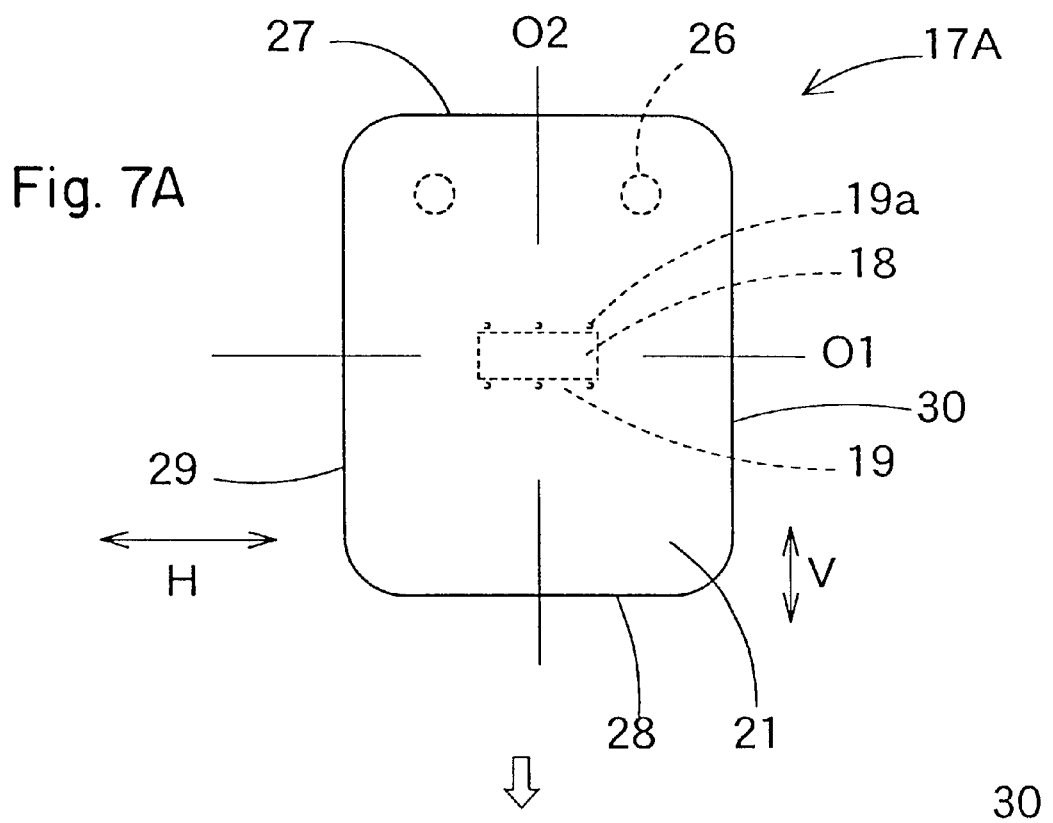
FIG. 7 are views for explaining a process of folding the airbag of the second embodiment.
Figure 7B:
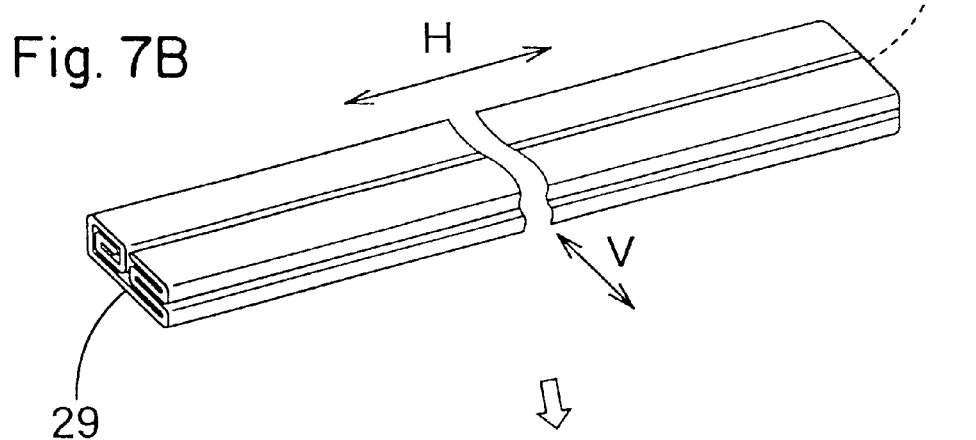
Figure 7C:
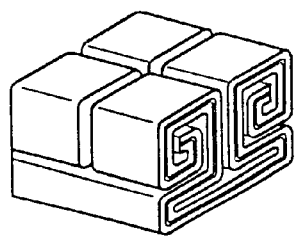

Next, an airbag system M2 for a front passenger's seat according to a second embodiment will be described with reference to FIG. 6. This airbag system M2 is substantially identical to that of the first embodiment. However, the airbag 17A is not equipped with the commutator cloth 22. Moreover, the airbag system M2 is constructed so as to include a case 7 comprised of a predetermined body 8 and a hold member 8, an inflator 10, a diffuser 11, a retainer 12 and a cover member 14. Moreover, this airbag system M2 is also similar to the first embodiment in terms of the process for folding the airbag 17A, as shown in FIG. 7.

In this airbag system M2, too, the inflating gas G flows, when the airbag 17A is expanded, from the gas inlet port 18 into the airbag 17A. Moreover, the airbag 17A pushes and opens, as its internal pressure rises, the doors 15 and 15 arranged within the instrument panel 2, until the airbag 17A extrudes from the opening 2a of the instrument panel 2.

Moreover, the airbag 17A is expanded at first while extending to the two sides of the transverse direction, thereby to undo the longitudinal folding. The airbag 17A is then expanded while extending to the two sides of the longitudinal direction perpendicular to the transverse direction, thereby to undo the transverse folding.

Specifically, at the beginning of its extension the airbag 17A does not extrude towards the rear of the vehicle, but rather extends to the two sides of the transverse direction. As a result, the airbag 17A is expanded towards the rear of the vehicle along the windshield 1 while undoing the longitudinal folding with its wide surface area.

In the airbag system M2 for the front passenger's seat according to the second embodiment, too, the airbag 17A is protruded and expanded towards the rear of the vehicle with its portion on the front passenger's side being extended to have a wide area towards the two sides of the transverse direction. In the airbag system M2, therefore, the expansion rate of the airbag 17A towards the rear of the vehicle can be reduced to reduce the expansion rate towards the passenger.

Although the top-mount type is exemplified in the second embodiment, the airbag 17A may be used in accordance with the later-described midway mount-type.

In the second embodiment, moreover, the process for folding the airbag 17A is made identical to that of the first embodiment, as shown in FIG. 7. This enables similar types of actions to occur on the method of folding the airbag 17A. Moreover, the airbag 17A of the second embodiment may be longitudinally folded, as shown at D in FIG. 4.

Next, an airbag system M3 for a front passenger's seat according to a third embodiment will be described with reference to FIG. 8. This airbag system M3 is of the midway-mount type. In this type, the airbag system M3 is so arranged that an inflatable airbag 17B does not have contact with the windshield 1. Specifically, the airbag system M3 is arranged in the opening 2a of the instrument panel 2, as formed apart from the windshield 1.

This airbag system M3 of the third embodiment is similar to that of the first embodiment. However, the airbag system M3 of the third embodiment is different from that of the first embodiment in the arrangement position of the midway mount type, in the shape of the commutator cloth 22, and in its folding process. Moreover, this airbag system M3 is constructed, as in the first embodiment, to include the case 7 comprised of the body 8 and the holding member 9, the inflator 10, the diffuser 11, the retainer 12, and the cover member 14.

Figure 9A:
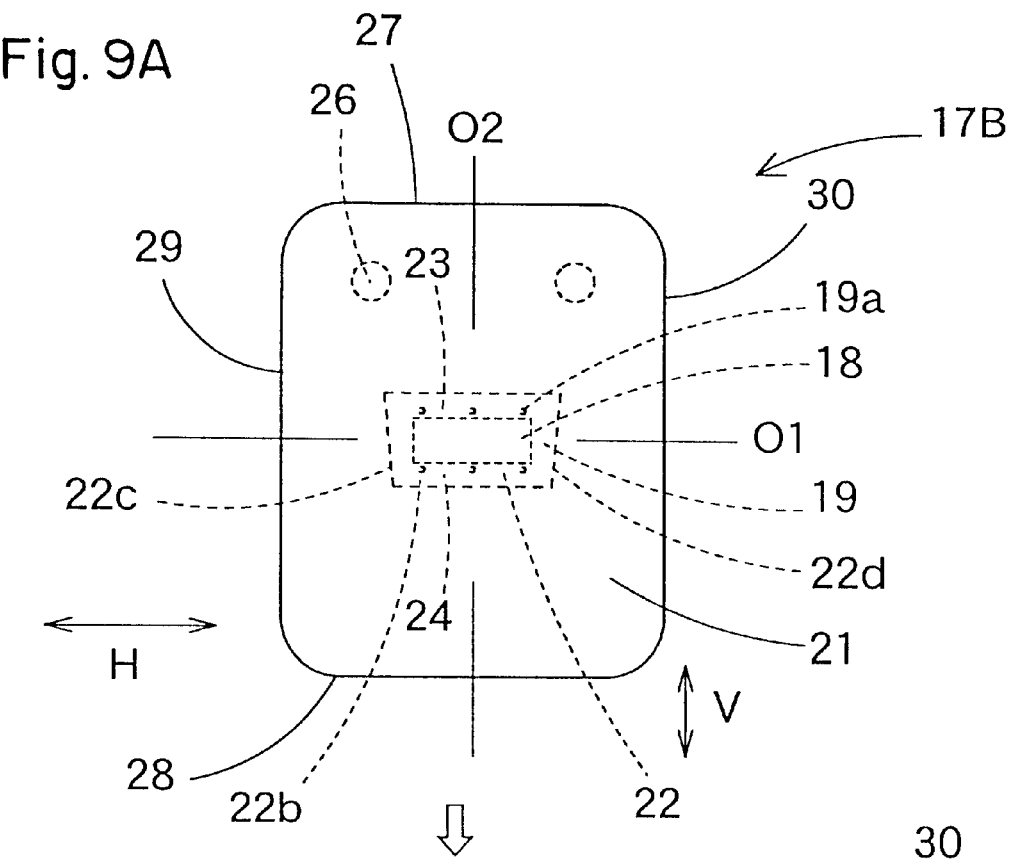
FIG. 9 are views for explaining a process of folding the airbag of the third embodiment.
Figure 9B:
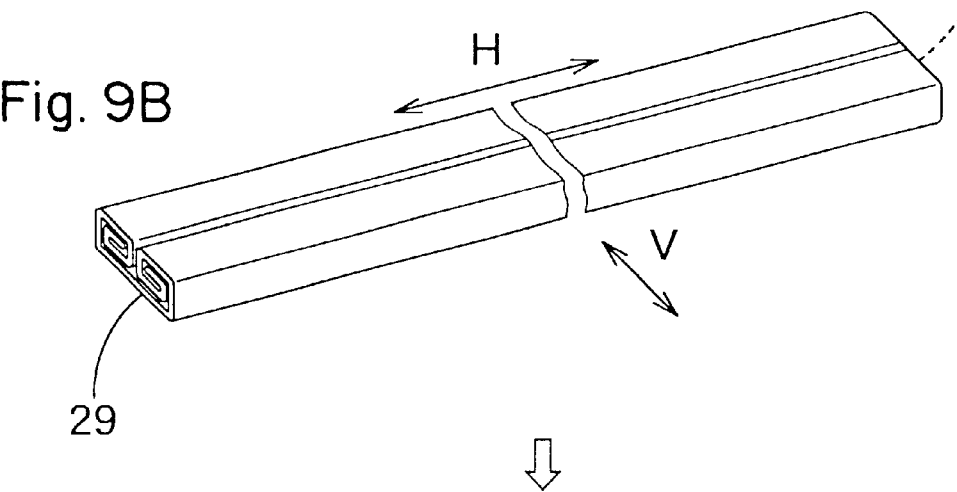
Figure 9C:
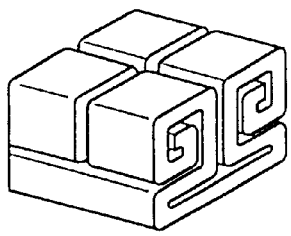

In this third embodiment, as shown at A in FIG. 9, the commutator cloth 22 is arranged within the airbag 17B. This commutator cloth 22 is so arranged that the front side opening 23 (or the upper opening 23 when the airbag 17B is mounted within the vehicle) and the rear side opening 24 (or the lower opening 24 when the airbag 17B is mounted within the vehicle) have an area ratio of 10:9. In the process for folding the airbag 17B, on the other hand, the airbag 17B is externally rolled when transversely folded, as shown at A and B in FIG. 9. Next, at the time of longitudinal folding, the airbag 17B is internally rolled, as shown at C in FIG. 9.

In this third embodiment, too, the inflating gas G flows, when the airbag 17B is expanded, from the gas inlet port 18 into the airbag 17B. Moreover, the airbag 17B pushes and opens, as its internal pressure rises, the doors 15 and 15 arranged in the instrument panel 2, until the airbag 17B extrudes from the opening 2a of the instrument panel 2.

Moreover, the airbag 17B is expanded at first while extending to the two sides of the transverse direction, thereby to undo the longitudinal folding. On the other hand, the inflating gas G that flows into the airbag 17B is made to branch by the commutator cloth 22 so that it to flows upward and downward perpendicular to the transverse direction. As a result, the airbag 17B will be quickly expanded by the commutator cloth 22 to the two sides of the generally vertical direction that is perpendicular to the transverse direction.

Immediately after having extruded from the opening 2a of the instrument panel 2, more specifically, the airbag 17B is expanded not only in the transverse direction but also towards the rear of the vehicle, with a wide area of the airbag 17B extended in the four directions, i.e., leftward, rightward, and generally upward and downward perpendicular to the transverse direction. As shown in FIG. 8, therefore, the airbag 17B is expanded towards the rear of the vehicle with the area at the vicinity of the central portion 21a of the ceiling wall portion 21 being widened in four directions, i.e., the transverse directions and the longitudinal directions perpendicular to the transverse. As a result, in the airbag system M3, the expansion rate of the airbag 17B towards the rear of the vehicle, and accordingly towards the passenger, can be reduced.

Here in the third embodiment, in regards to the upper and lower openings 23 and 24 of the commutator cloth 22, the upper opening 23 and the lower opening 24 are set to have an area ratio of 10:9. This makes the inflow of the inflating gas G to be more at the upper side portion 17a at the beginning of the expansion. As a result, even when the upper side portion 17a is arranged to be in front of the lower side portion 17b, the greater inflow of the inflating gas G causes the area at the vicinity of the central portion 21a of the ceiling wall portion 21, or the portion within the airbag 17B on the front passenger's side, to generally expand backward in a vertical plane. Thus, this airbag 17B also enables an even further reduction of that portion of the airbag which might otherwise partially extrude towards the passenger. In other words, this airbag system M3 reduce the pressure induced on the passenger, even while the airbag 17B restricts the passenger before the end of expansion.

On the other hand, the airbag 17B of the third embodiment is rolled, when transversely folded, along the sides of both the two edges 27 and 28. This rolled folding results in a higher resistance to expansion than with the bellows type folding. This promote extension in the transverse directions when the airbag 17B is expanded. Here, the rolled-type folding at the time of transverse folding may be exemplified not only by the externally rolled folding type, but also by the internally rolled folding type, by or the modified internally rolled folding type.

Moreover, the third embodiment is exemplified by the airbag 17B having the commutator cloth 22. In the third embodiment, however, an airbag 17A having no commutator cloth 22 arranged therein may also be adopted.

When the commutator cloth 22 is arranged, it is desired to increase the area ratio of the front side opening 23 to the rear side opening 24 as the plane of the opening 2a of the instrument panel 2 comes closer towards the horizontal plane, that is, as the protruding direction of the airbag 17B from the opening 2a of the instrument panel 2 comes closer to the vertical direction. It is also desired to make the area of the front side opening 23 more approximate to that of the rear side opening 24 as the plane of the opening 2a comes closer toward the vertical plane, that is, as the protruding direction of the airbag 17B from the opening 2a of the instrument panel 2 comes closer to the horizontal direction. Further, when the protruding direction of the airbag 17B from the opening 2a of the instrument panel 2 reaches the horizontal direction, it is desired to equalize the area of the front side opening 23 to that of the rear side opening 24. With these desires for the construction being satisfied, the vicinity of the central portion 21a of the ceiling wall portion 21, or the portion on the front passenger's side, can be expanded backwards within the generally vertical plane.

Figure 10:
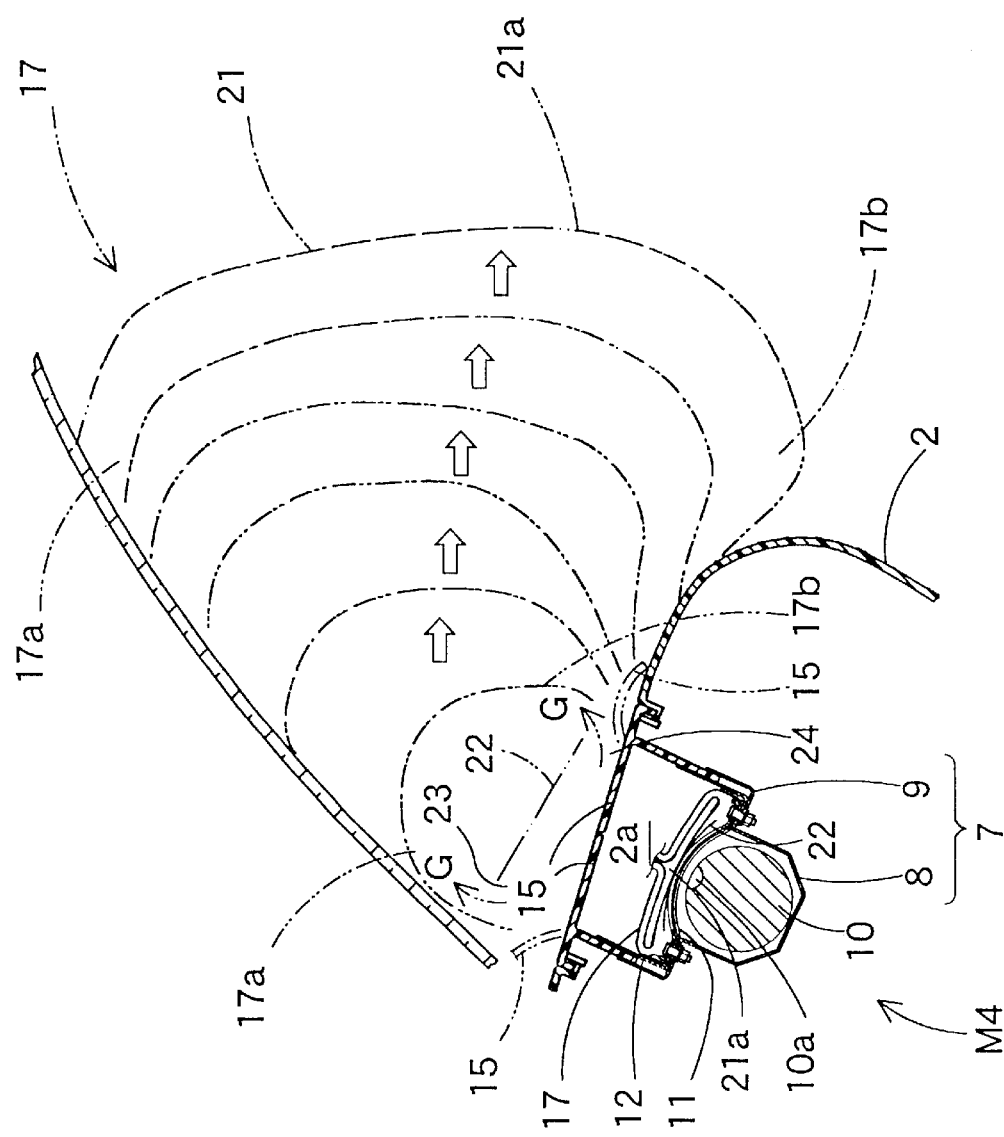
FIG. 10 is a schematic diagram showing an inflated state of an airbag of an airbag system according to a fourth embodiment.

An airbag system, M4 for a front passenger's seat according to a fourth embodiment will be described with reference to FIG. 10. This airbag system M4 is generally similar to that of the first embodiment, excepting the process for folding the airbag 17. Moreover, the airbag system M4 is of the top-mount type as in the first embodiment, and is constructed to include the case 7 comprised of the body 8 and the hold member 9, the inflator 10, the diffuser 11, the retainer 12, the cover member 14, and the airbag 17.

Figure 11A:
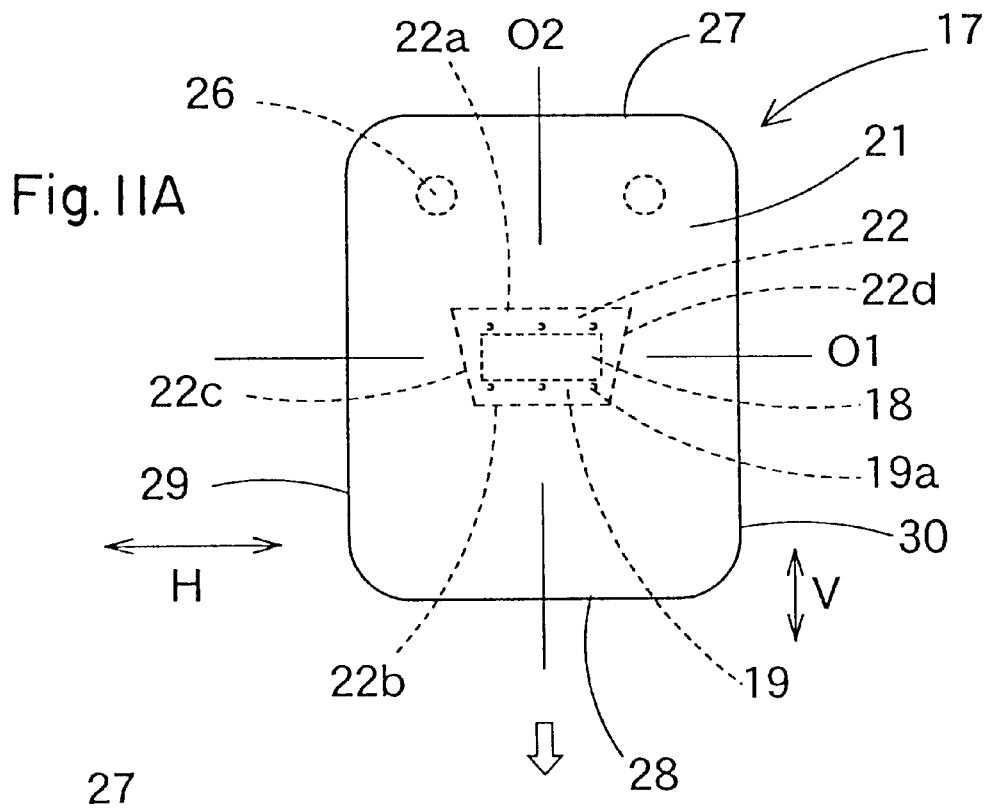
FIG. 11 are views for explaining a process of folding the airbag of the fourth embodiment.
Figure 11B:
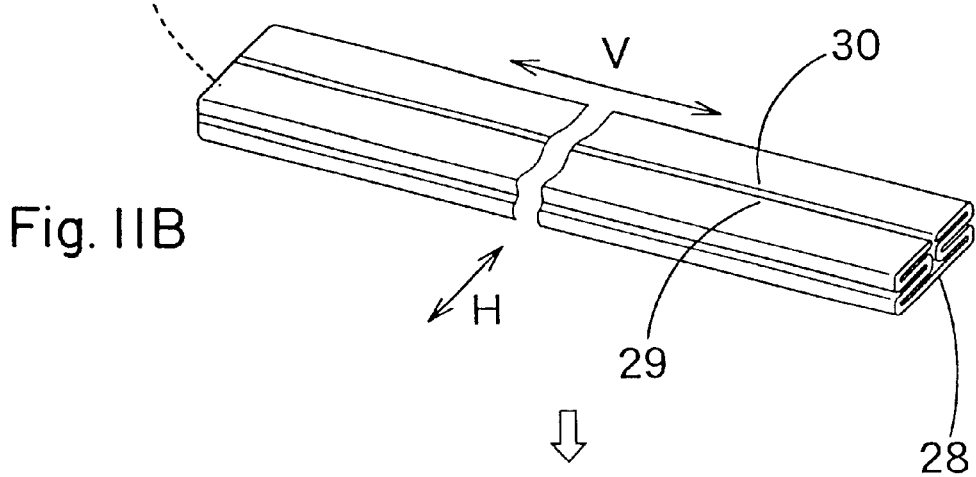
Figure 11C:
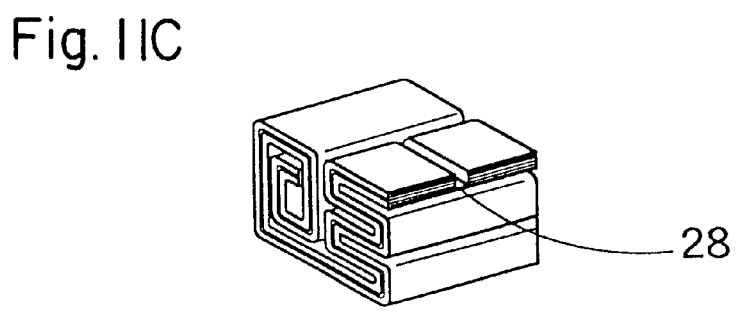

In the process for folding this airbag 17, the longitudinal folding is first performed, as shown at A and B in FIG. 11, by making a bellows-type folding so that the left and right edges 29 and 30 are brought close to the center O2. Next, as shown at B and C in FIG. 11, transverse folding is performed to bring the front and rear edges 27 and 28 close to the center O1. In the transverse folding of the embodiment, the front edge 27 is externally rolled, whereas the rear edge 28 is folded into a bellows-shape.

In this fourth embodiment, too, the inflating gas G flows, when the airbag 17 is expanded, from the gas inlet port 18 into the airbag 17. Then, the airbag 17 pushes and opens, as its internal pressure rises, the doors 15 and 15 arranged in the instrument panel 2, until the airbag 17 extrudes from the opening 2a of the instrument panel 2.

Moreover, the inflating gas G that flows into the airbag 17 is branched by the commutator cloth 22 to flow forwards and backwards. As a result, the airbag 17 is quickly expanded in the longitudinal directions. At this time, the front side portion 17a extrudes towards the rear of the vehicle along the windshield 1. On the other hand, the rear side portion 17b extrudes towards the rear of the vehicle along the upper face of the instrument panel 2.

Specifically, at the beginning of expansion the front side portion 17a extrudes towards the rear of the vehicle along the windshield 1, which is sloped downwards towards its front. On the other hand, the rear side portion at the beginning of expansion extrudes backward along the upper face of the instrument panel 2. As a result, the airbag 17 is expanded towards the rear of the vehicle at a vertically open angle so as to close the space between the inner face of the windshield 1 and the upper face of the instrument panel 2.

In the airbag system M4 for the front passenger's seat according to the fourth embodiment, therefore, the airbag 17 is moved, after having extruded from the instrument panel 2, towards the rear of the vehicle at a vertically open angle, i.e., in a wide plane having a large area at the portion 21a on the side of the passenger. At this time, the airbag 17 is not expanded so as to have a partial backward extrusion. This enables the airbag system M4 to reduce the expansion rate of the airbag 17 towards the rear back of the vehicle, thereby to reduce the expansion rate of the same towards the passenger.

In the fourth embodiment, on the other hand, the front and rear side openings 23 and 24 of the commutator cloth 22 are also retained such that the area of the front side opening 23 is given a larger area than that of the rear side opening 24 (that is, the area ratio of the openings 23 and 24 is made to be 4:3). This makes the inflow of the inflating gas G higher at the front side portion 17a at the beginning of expansion. When the front side portion 17a moves backward along the windshield 1 that is sloped downward towards its front, its longitudinal position is substantially identical to that of the rear side portion 17b at the beginning of expansion. As a result, the vicinity of the central portion 21a of the ceiling wall portion 21, i.e., the portion on the front passenger's side is expanded backwards within the generally vertical plane. This further reduces the partial protrusion towards the passenger, even of the airbag 17. In this airbag system M4, therefore, the pressure induced on the passenger can be reduced, even while the airbag 17 restricts the passenger before the completion of expansion.

Figure 12:
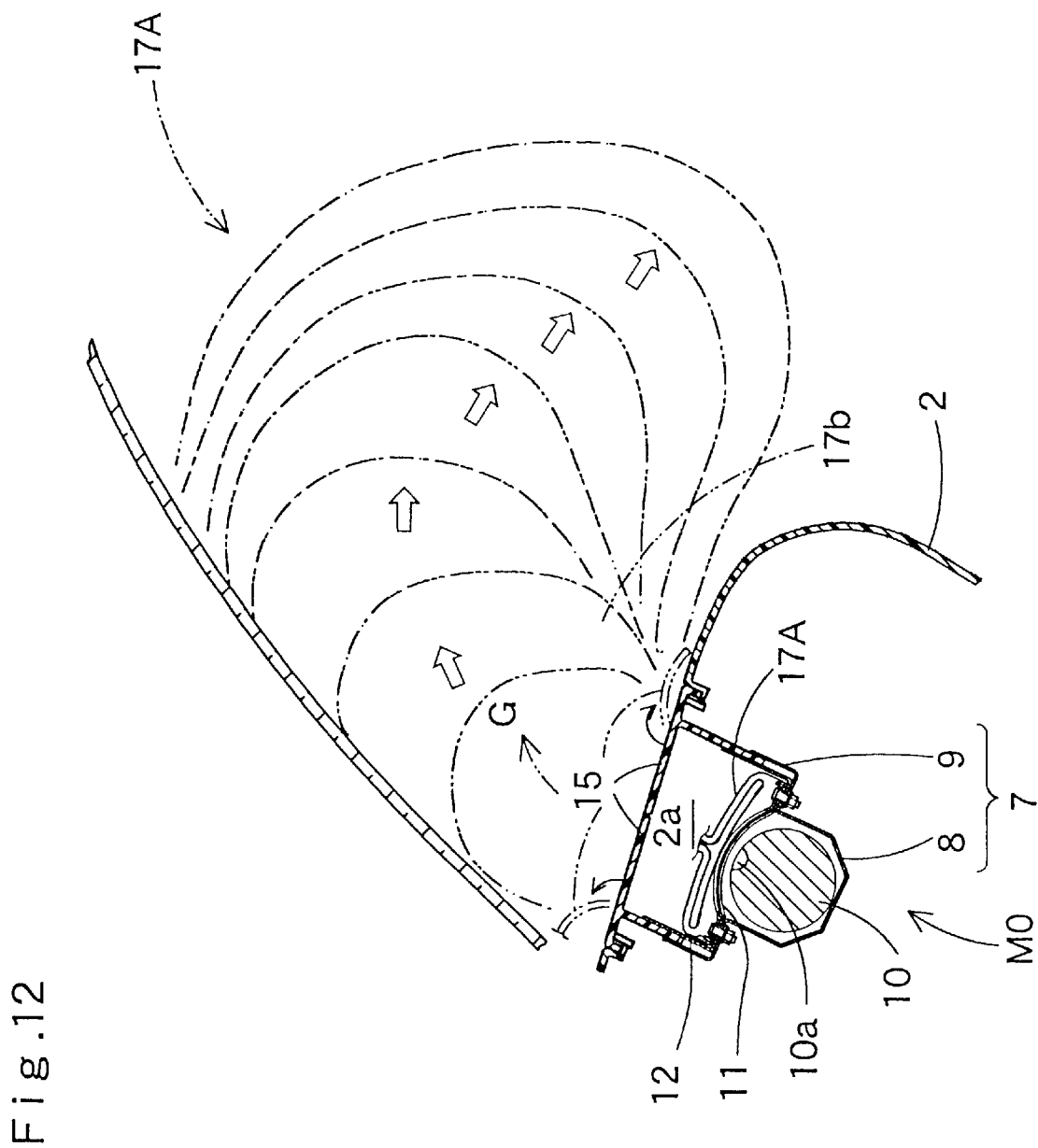
FIG. 12 is a schematic diagram showing an inflated state of an airbag of an airbag system of an example for comparison.
Figure 13A:
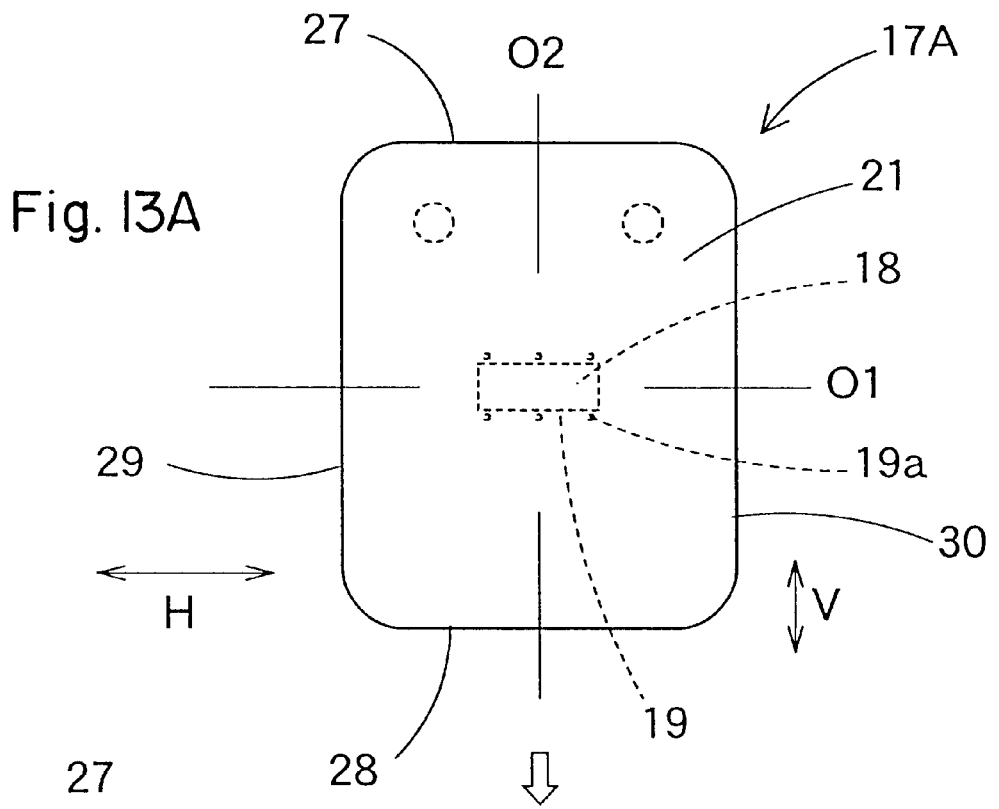
FIG. 13 are views for explaining a process of folding the airbag of the comparison.
Figure 13B:
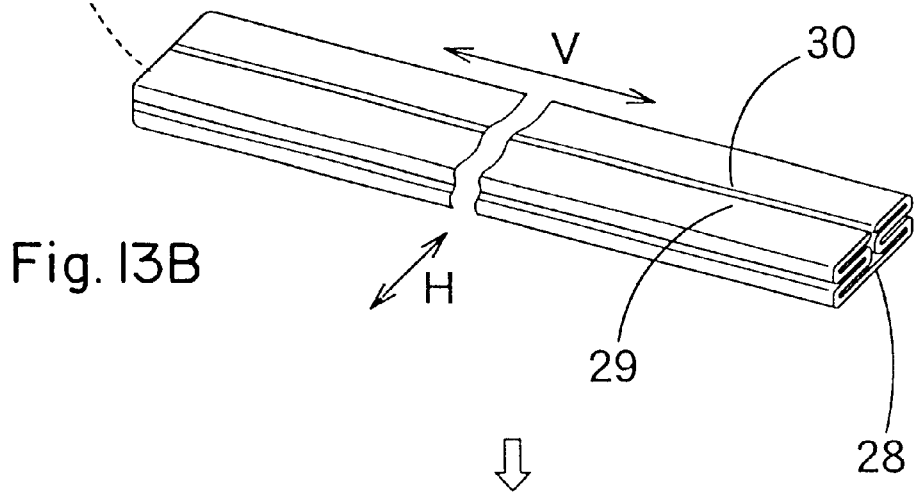
Figure 13C:
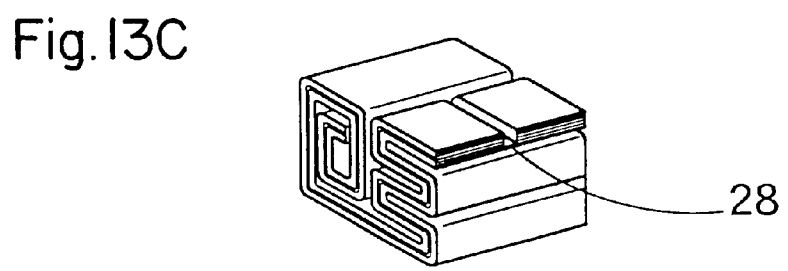

Next, an airbag system M0 for a front passenger's seat is shown as a comparison in FIGS. 12 and 13. This airbag system M0 employs an airbag 17A which has no commutator cloth 22. In this airbag system M0, moreover, the airbag 17A is folded by a process similar to that of the fourth embodiment. In this airbag system M0, the rear side portion 17b at the beginning of expansion does not follow the upper face of the instrument panel 2 when the airbag 17A is expanded. Moreover, the rear side portion 17b at the beginning of expansion extrudes towards the rear of the vehicle. Thus, the airbag 17A extrudes towards the rear of the vehicle at a vertically narrowed angle. As a result, this airbag system M0 cannot be desired to lower the expansion rate of the airbag 17A towards the back of the vehicle.

In the airbag system M0 of the comparison, moreover, the airbag 17A is expanded downwards after having once extruded upwards. In the airbag 17 of the fourth embodiment, on the contrary, the ceiling wall portion 21 moves backwards over a wide plane. This enables the airbag 17 of the fourth embodiment to reduce the downward pressure. The folding process of the fourth embodiment could naturally be so modified such that the airbag 17 is transversely and then longitudinally folded, as in the process for folding the airbag 17 in the first embodiment. This modification is preferable because the airbag can then restrict the passenger over a wider plane.

Here, it is desirable, as in the fourth embodiment, that the commutator cloth 22 to be attached to the airbag 17 of the airbag system M4 of the top-mount type be larger in area at the front side opening 23 than at the rear side opening 24. This, is because the inflow of the inflating gas G that flows into the front side portion 17a at the beginning of expansion can be increased. Thus, the front side portion 17a can be quickly expanded backwards along the windshield 1. As a result, the front passenger's side portion 21a can be moved along the vertical plane. It is, moreover, preferable that the area ratio between the front side opening 23 and the rear side opening 24 be within a range of from 4:3 to 2:1, namely, that the area of the rear side opening 24 is within a range of 50% to 75% vis-à-vis that of the front side opening 23. Below 50%, it is difficult to retain the movement of the rear side portion 17b along the upper face of the instrument panel 2. This is because below 50%, the expansion of the airbag 17 at the vertically large angle is obstructed. On the other hand, at over 75%, there is a reduced difference between the inflows of the inflating gas into the front side portion 17a and the rear side portion 17b, respectively. Thus at over 75%, there is a resulting reduction of the effects realized by arranging the passenger's side portion 21a along the vertical direction.

Figure 14:
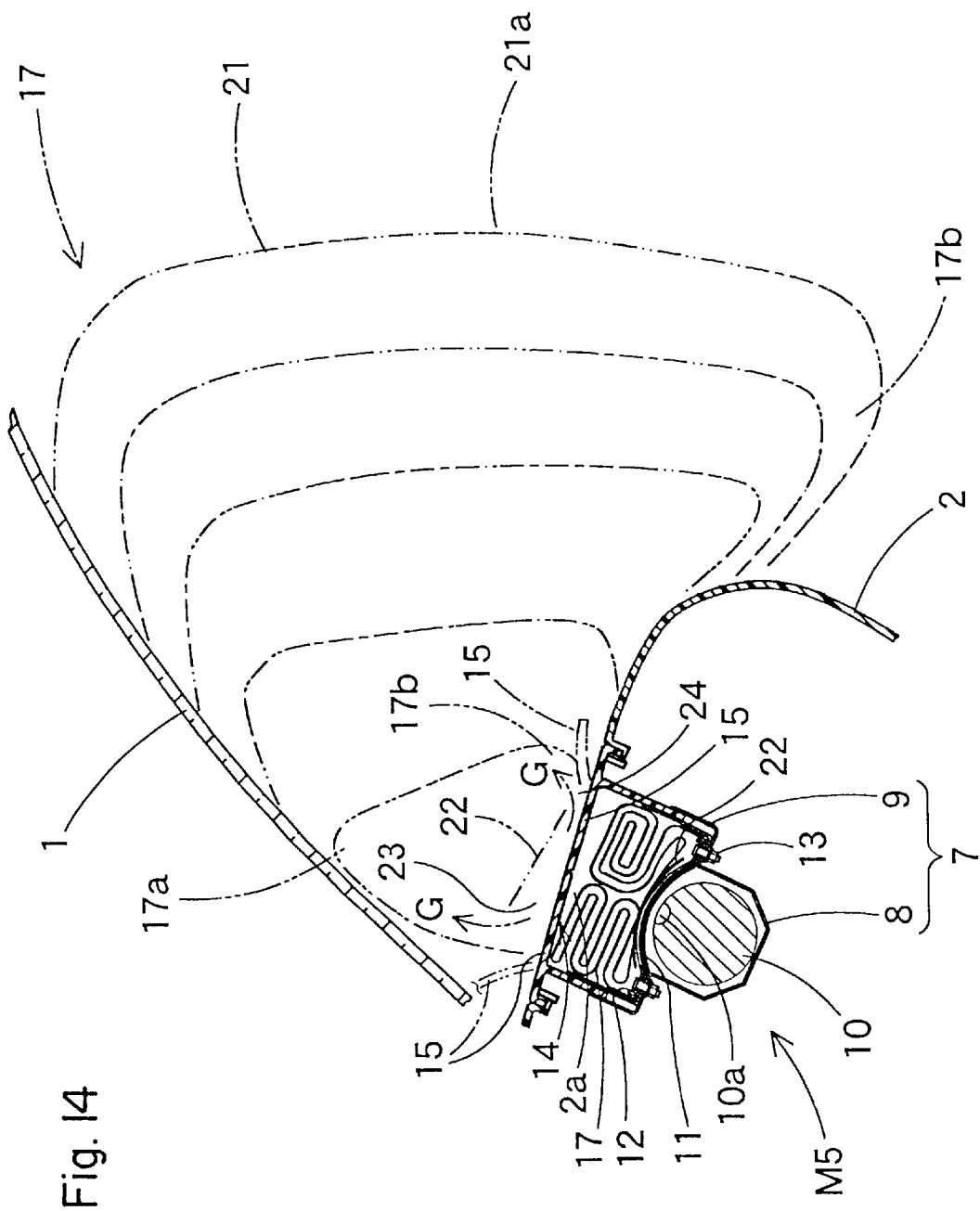
FIG. 14 is a schematic diagram showing an inflated state of an airbag of an airbag system of a fifth embodiment.
Figure 15A:
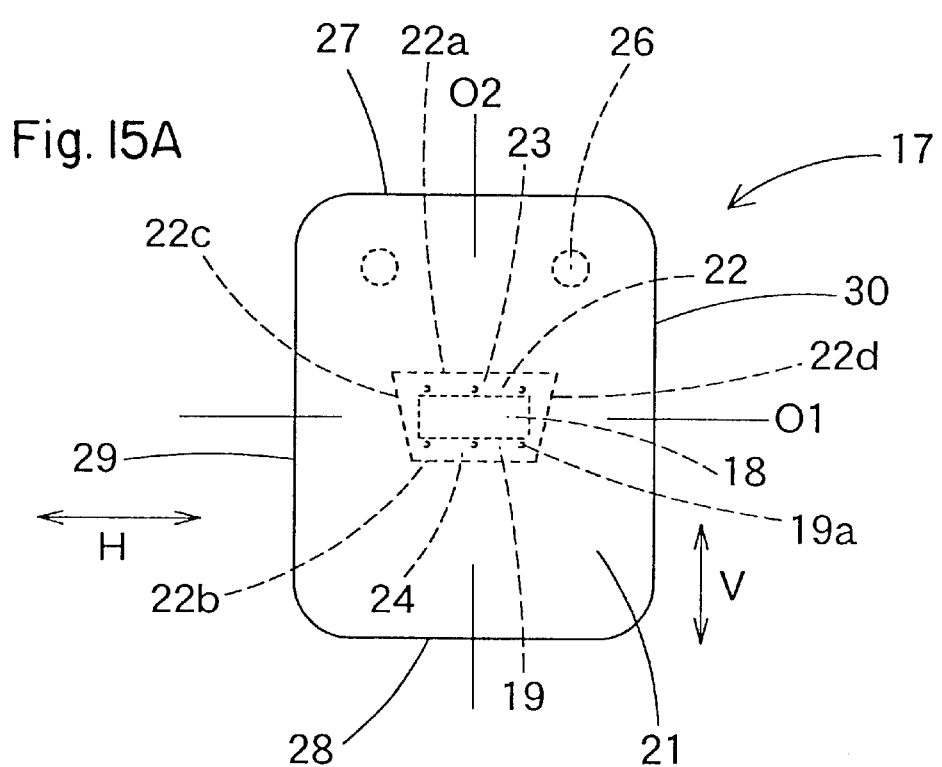
FIG. 15 are views for explaining a process of folding the airbag of the fifth embodiment.
Figure 15B:
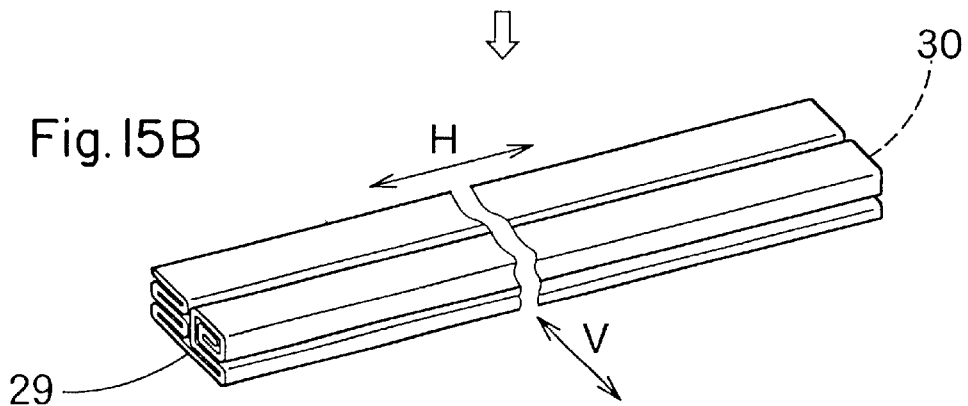
Figure 15C:
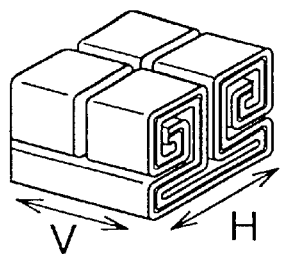
Figure 15D:
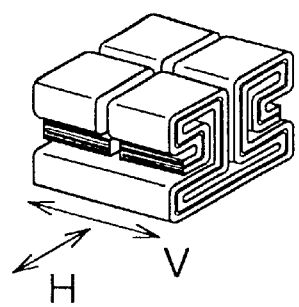

Next, an airbag system MS for a front passenger's seat according to a fifth embodiment will be described with reference to FIG. 14. This airbag system M5 of the fifth embodiment is similar to that of the first embodiment. However, in the airbag system M5 of the fifth embodiment, a transverse folding in its folding process of the airbag 17 is different from that of the first embodiment. Moreover, this airbag system M5 is constructed, as in the first embodiment, to include the case 7 comprised of the body 8 and the holding member 9, the inflator 10, the diffuser 11, the retainer 12, the cover member 14, and the airbag 17.

In the process for folding this airbag 17, the transverse folding is first performed, as shown at A and B in FIG. 15, by making an internally rolled so that the rear edge 28 is brought close to the center O1, and by making a bellows-type folding so that the front edge 27 is brought close to the center O1. Next, as shown at B and C in FIG. 15, longitudinal folding is performed by making an internally rolled so that the left and right edges 29 and 30 are brought close to the center O2.

In this fifth embodiment, too, the inflating gas G flows, when the airbag 17 is expanded, from the gas inlet port 18 into the airbag 17. Then, the airbag 17 pushes and opens, as its internal pressure rises, the doors 15 and 15 arranged in the instrument panel 2, until the airbag 17 extrudes from the opening 2a of the instrument panel 2.

Moreover, the airbag 17 is expanded at first while extending to the two sides of the transverse direction, thereby to undo the longitudinal folding. On the other hand, the inflating gas G that flows into the airbag 17 is made to branch by the commutator cloth 22 so that it to flows upward and downward perpendicular to the transverse direction. As a result, the airbag 17 will be quickly expanded by the commutator cloth 22 to the two sides of the generally vertical direction that is perpendicular to the transverse direction.

Especially, in the fifth embodiment, the rear edge 28 of the airbag 17 is internally rolled. Therefore, the rear side portion 17b of the airbag 17 is protruded not toward the passenger but downward along the instrument panel 2.

Moreover, the front edge 27 of the airbag 17 is made the bellows-type folding. Therefore, the front side portion 17a of the airbag 17 is expanded quickly.

As a result, in this airbag system M5, the area at the vicinity of the central portion 21a of the ceiling wall portion 21, i.e., the portion on the front passenger's side can be expanded widely. And, the vicinity of the central portion 21a can be expanded to the generally vertical plane quickly. Then, the vicinity of the central portion 21a is expand backwards within the generally vertical plane. Therefore, in this airbag system M5, too, the pressure induced on the passenger can be reduced even further, even while the airbag 17 restricts the passenger before the end of expansion.

Moreover, in the fifth embodiment, the airbag 17 is internally rolled, when longitudinally folded. However, as shown at D in FIG. 15, the sides of left and right edges 29 and 30 of the airbag 17 may be folded by a modified internally rolled folding, when longitudinally folded.

Further, the fifth embodiment is exemplified by the airbag 17 having the commutator cloth 22. However, an airbag 17A having no commutator cloth 22 arranged therein may also be adopted. In this case, as shown at A, B and C (A, B, and D) in FIG. 16, the airbag 17A is folded by a process similar to that of the fifth embodiment. In the the airbag system having the airbag 17A, the vicinity of the central portion 21a of the ceiling wall portion 21, i.e., the portion on the front passenger's side can be expanded widely. And, the vicinity of the central portion 21a can be expanded to backwards within the generally vertical plane quickly, in comparison with the second embodiment.

What is claimed is:

1. A front passenger's seat airbag system of the top-mount type arranged in an instrument panel below a windshield, comprising:

a door arranged on the upper face of said instrument panel;

a case; and an airbag housed and held in a folded state in said case and including a gas inlet port for injecting an inflating gas thereinto, so that said airbag is expanded, by injecting the inflating gas into said gas inlet port, towards the rear of a vehicle along said windshield while opening said door, wherein said airbag further includes a commutator cloth arranged so as to cover said gas inlet port and to close left and right sides of the gas inlet port in the transverse direction of the vehicle, and to open front and rear sides of the gas inlet port in the longitudinal direction of the vehicle, wherein front and rear openings in the gas inlet port, as formed by said commutator cloth, in the longitudinal direction of the vehicle are so set that the front opening has a larger area than that of the rear opening, wherein said airbag is housed in said case by folding a ceiling wall side of said airbag confronting said gas inlet port to approach said gas inlet port, subsequently by longitudinally folding left and right edges to approach the vicinity of the center, and further by transversely folding front and rear longitudinal edges perpendicular to the transverse direction to approach the vicinity of the center.

2. A front passenger's seat airbag system of the top-mount type arranged in an instrument panel below a windshield, comprising:

a door arranged on the upper face of said instrument panel;

a case; and an airbag housed and held in a folded state in said case and including a gas inlet port for injecting an inflating gas thereinto, so that said airbag is expanded, by injecting the inflating gas into said gas inlet port, towards the rear of a vehicle along said windshield while opening said door, wherein said airbag further includes a commutator cloth arranged so as to cover said gas inlet port and to close left and right sides of the gas inlet port in the transverse direction of the vehicle, and to open front and rear sides of the gas inlet port in the longitudinal direction of the vehicle, wherein front and rear openings in the gas inlet port, as formed by said commutator cloth, in the longitudinal direction of the vehicle are so set that the front opening has a larger area than that of the rear opening, wherein the commutator cloth is seamed in the shape of "\ /", wherein a front edge of the commutator cloth is longer than a rear edge at portions positioned at the left and right sides of the gas inlet port.

3. A front passenger's seat airbag system of the top-mount type arranged in an instrument panel below a windshield, comprising:

a door arranged on the upper face of said instrument panel;

a case; and an airbag housed and held in a folded state in said case and including a gas inlet port for injecting, an inflating gas thereinto, so that said airbag is expanded, by injecting the inflating gas into said gas inlet port, towards the rear of a vehicle along said windshield while opening said door, wherein said airbag further includes a commutator cloth arranged so as to cover said gas inlet port and to close left and right sides of the gas inlet port in the transverse direction of the vehicle, and to open front and rear sides of the gas inlet port in the longitudinal direction of the vehicle, wherein front and rear openings in the gas inlet port, as formed by said commutator cloth, in the longitudinal direction of the vehicle are so set that the front opening has a larger area than that of the rear opening, wherein the commutator cloth protrudes from an upper face of said instrument panel in an inclined state which the front side is higher than the rear side when the airbag is expanded, and the front opening has a larger area than that of the rear opening.

4. A front passenger's seat airbag system according to claim 3, wherein the commutator cloth is seamed at the portions positioned at the left and the right gas inlet port.

5. A front passenger's seat airbag system according to claim 3, wherein the commutator cloth is seamed in the shape of "\ /", wherein a front edge of the communicator cloth is longer than a rear edge at portions positioned at the left and right sides of the gas inlet port.

* * * * *